(12) United States Patent
Iwata et al.

(10) Patent No.: US 11,683,268 B2
(45) Date of Patent: Jun. 20, 2023

(54) SWITCH DEVICE, COMMUNICATION CONTROL METHOD AND RECORDING MEDIUM

(71) Applicants: Sumitomo Electric Industries, Ltd., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihito Iwata, Osaka (JP); Takeshi Hagihara, Yokkaichi (JP); Yasuhiro Yabuuchi, Yokkaichi (JP)

(73) Assignees: Sumitomo Electrical industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 529 days.

(21) Appl. No.: 16/499,767

(22) PCT Filed: Mar. 27, 2018

(86) PCT No.: PCT/JP2018/012539
§ 371 (c)(1),
(2) Date: Sep. 30, 2019

(87) PCT Pub. No.: WO2018/181378
PCT Pub. Date: Oct. 4, 2018

(65) Prior Publication Data
US 2020/0106704 A1    Apr. 2, 2020

(30) Foreign Application Priority Data

Mar. 31, 2017 (JP) .............................. JP2017-072281

(51) Int. Cl.
*H04L 45/74* (2022.01)
*H04L 45/00* (2022.01)
(Continued)

(52) U.S. Cl.
CPC .............. *H04L 45/72* (2013.01); *H04L 45/52* (2013.01); *H04L 67/12* (2013.01); *H04L 45/745* (2013.01)

(58) Field of Classification Search
None
See application file for complete search history.

(56) References Cited

U.S. PATENT DOCUMENTS

2008/0008183 A1*   1/2008  Takagaki ................ H04L 47/27
                                                          370/392

FOREIGN PATENT DOCUMENTS

JP          11-55304 A       2/1999
JP         2013-168865 A     8/2013

* cited by examiner

*Primary Examiner* — Willie J Daniel, Jr.
(74) *Attorney, Agent, or Firm* — McCarter & English, LLP; Michael A. Sartori

(57) ABSTRACT

A switch device for relaying data in an on-vehicle network, being equipped with a switch section and a processing section for performing the relay processing via the switch section, wherein, in the case that a plurality of frames to be subjected to the relay processing is present in the processing section, the processing section performs adjustment processing so that the output rates of the respective frames to the switch section in the case that the transmission source addresses of the respective frames are different are made smaller than the output rate in the case that the transmission source addresses of the respective frames are the same.

8 Claims, 29 Drawing Sheets

(51) Int. Cl.
*H04L 45/52* (2022.01)
*H04L 67/12* (2022.01)
*H04L 45/745* (2022.01)

SWITCH DEVICE, COMMUNICATION CONTROL METHOD AND RECORDING MEDIUM

CROSS-REFERENCE TO RELATED APPLICATIONS

This application is the national phase under 35 U.S.C. § 371 of PCT International Application No. PCT/JP2018/012539 which has an International filing date of Mar. 27, 2018 and designated the United States of America.

FIELD

The present disclosure relates to a switch device, a communication control method and a recording medium.

This application claims the priority based on Japanese Patent Application No. 2017-72281 filed on Mar. 31, 2017, and its disclosure is incorporated herein in its entirety.

BACKGROUND

Japanese Patent Application Laid-Open Publication No. 2013-168865 discloses the following on-vehicle network system.

In other words, the on-vehicle network system is equipped with an on-vehicle control device having a memory for storing definition data defining portions that are included in communication protocols for use on an on-vehicle network and depend on implementation on the on-vehicle network and a communication protocol issuing device for issuing the definition data to the on-vehicle control device. Upon receiving a registration request requesting to make the on-vehicle control device participate in the on-vehicle network from a registration device for making the on-vehicle control device participate in the on-vehicle network, the communication protocol issuing device performs authentication to the registration device, creates the definition data conforming to the implementation on the on-vehicle network and transmits the definition data to the registration device as a reply. The registration device receives the definition data transmitted by the communication protocol issuing device and requests the on-vehicle control device to store the received definition data on the memory. After that, the on-vehicle control device receives the definition data from the registration device, stores the definition data on the memory, and performs communication using the on-vehicle network according to the portions defined by the definition data while conforming to the communication protocols.

SUMMARY (1) A switch device according to this disclosure is a switch device for relaying data in an on-vehicle network, being equipped with a switch section and a processing section for performing the relay processing via the switch section, wherein in the case that a plurality of frames to be subjected to the relay processing is present in the processing section, the processing section performs adjustment processing so that the output rates of the respective frames to the switch section in the case that the transmission source addresses of the respective frames are different are made smaller than the output rates in the case that the transmission source addresses of the respective frames are the same.

(5) Another switch device according to this disclosure is a switch device for relaying data in an on-vehicle network, being equipped with a switch section and a processing section for performing the relay processing via the switch section, wherein, in the case that a plurality of frames to be subjected to the relay processing is present in the processing section and when the transmission source addresses of the respective frames are different, the processing section performs adjustment processing for transmitting an instruction regarding the transmission timing of the frames to at least either one of the devices having the respective transmission source addresses.

(8) A communication control method according to this disclosure is a communication control method in a switch device for relaying data in an on-vehicle network and being equipped with a switch section and a processing section for performing relay processing via the switch section, including the step of performing the relay processing via the switch section and the step of confirming whether a plurality of frames to be subjected to the relay processing is present in the processing section, wherein, in the step of performing the relay processing, in the case that a plurality of frames to be subjected to the relay processing is present in the processing section, adjustment processing is performed so that the output rates of the respective frames to the switch section in the case that the transmission source addresses of the respective frames are different are made smaller than the output rates in the case that the transmission source addresses of the respective frames are the same.

(9) Another communication control method according to this disclosure is a communication control method in a switch device for relaying data in an on-vehicle network and being equipped with a switch section and a processing section for performing relay processing via the switch section, including the step of performing the relay processing via the switch section and the step of confirming whether a plurality of frames to be subjected to the relay processing is present in the processing section, wherein, in the step of performing the relay processing, in the case that a plurality of frames to be subjected to the relay processing is present in the processing section and when the transmission source addresses of the respective frames are different, adjustment processing is performed so that an instruction regarding the transmission timing of the frames is transmitted to at least either one of the devices having the respective transmission source addresses.

(10) A computer readable non-transitory recording medium according to this disclosure is the computer readable non-transitory recording medium recording a communication control program for use in a switch device for relaying data in an on-vehicle network and for making a computer function as a switch section and a processing section for performing the relay processing via the switch section, wherein, in the case that a plurality of frames to be subjected to the relay processing is present in the processing section, the processing section performs adjustment processing so that the output rates of the respective frames to the switch section in the case that the transmission source addresses of the respective frames are different are made smaller than the output rates in the case that the transmission source addresses of the respective frames are the same.

(11) Another computer readable non-transitory recording medium according to this disclosure is the computer readable non-transitory recording medium recording a communication control program for use in a switch device for relaying data in an on-vehicle network and for making a computer function as a switch section and a processing section for performing the relay processing via the switch section, wherein, in the case that a plurality of frames to be subjected to the relay processing is present in the processing section and when the transmission source addresses of the respective frames are different, the processing section performs adjustment processing for transmitting an instruction regarding the transmission timing of the frames to at least either one of the devices having the respective transmission source addresses.

An embodiment of this disclosure can be achieved not only as the switch device equipped with these characteristic processing sections but also as an on-vehicle communication system equipped with the switch device. Furthermore, the embodiment of this disclosure can be achieved as a semiconductor integrated circuit achieving part or the whole of the switch device. The above and further objects and features of the invention will more fully be apparent from the following detailed description with accompanying drawings.

Figure 1:
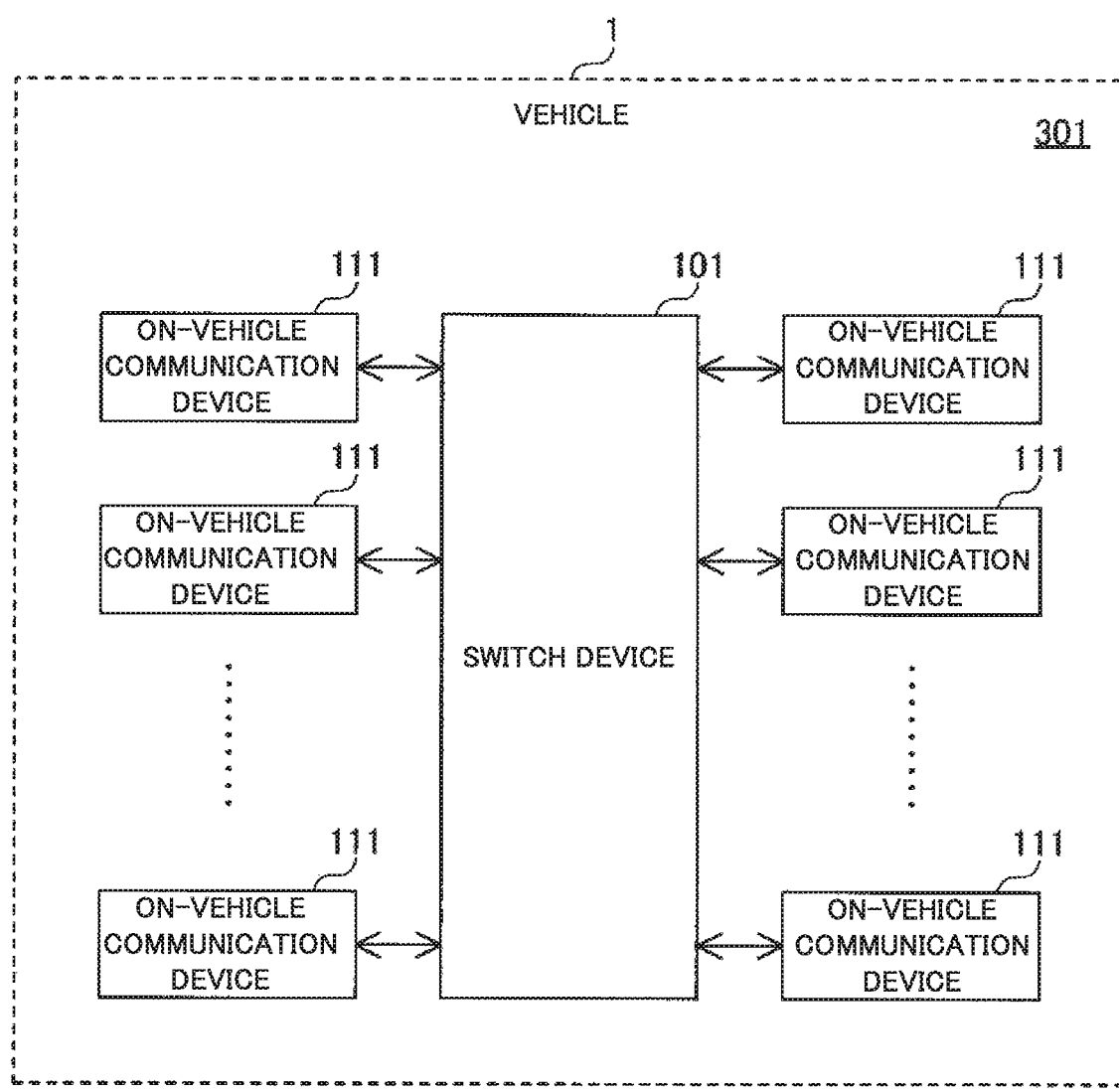
FIG. 1 is a view showing a configuration of an on-vehicle communication system according to a first embodiment of the present disclosure.

Conventionally, on-vehicle network systems for improving security in on-vehicle networks have been developed.

The on-vehicle network described in Japanese Patent Application Laid-Open Publication No. 2013-168865 is provided with a communication gateway for relaying information transmitted from the on-vehicle control device.

For example, as a configuration of the communication gateway, a configuration equipped with an L2 switch for performing layer 2 (L2) relay processing and an MCU (Micro Control Unit) for performing layer 3 (L3) relay processing is conceivable.

In this configuration, for example, in the case that the communication gateway has received data, the L2 switch relays data that can be relayed at the L2 level and outputs data that is required to be processed at the L3 level to the MCU. Upon receiving the data from the L2 switch, the MCU relays the received data and transmits the data to a relay destination device via the L2 switch. In this relay processing, the data is serially processed.

For example, in a congested state in which the communication gateway receives data from a plurality of communication paths in parallel, part of the received data is required to be put on standby. Hence, the received data is temporarily stored, for example, in the RAM (Random Access Memory) for the L2 switch.

However, in the case that the remaining capacity of the RAM is scarce, data loss may sometimes occur. Although it is conceivable to use a configuration in which the output rate of the data from the MCU to the L2 switch is lowered in order to solve this problem, since the output rate of the data from the MCU to the L2 switch is low in this case, relay processing takes time even in a non-congested state in which the remaining capacity of the RAM is sufficient.

This disclosure is intended to solve the above-mentioned problems, and an object thereof is to provide a switch device, a communication control method and a communication control program capable of efficiently performing relay processing while preventing data loss in an on-vehicle network.

With this disclosure, in an on-vehicle network, relay processing can be performed efficiently while preventing data loss.

First, the contents of embodiments of the present disclosure will be listed and described.

(1) A switch device according to an embodiment of the present disclosure is a switch device for relaying data in an on-vehicle network, being equipped with a switch section and a processing section for performing the relay processing via the switch section, wherein, in the case that a plurality of frames to be subjected to the relay processing is present in the processing section, the processing section performs adjustment processing so that the output rates of the respective frames to the switch section in the case that the transmission source addresses of the respective frames are different are made smaller than the output rates in the case that the transmission source addresses of the respective frames are the same.

With this configuration, the processing section can judge whether the switch device incorporating the processing section is in a congested state on the basis of whether the transmission source addresses of the respective frames are the same. And then, in the case that the transmission source addresses of the respective frames are different, the processing section judges that the switch device is in a congested state in which there is a high possibility that the remaining capacity of the RAM will become scarce and then lowers the output rates, thereby being capable of preventing data loss. Furthermore, in the case that the transmission source addresses of the respective frames are the same, the processing section judges that the switch device is in a non-congested state in which the possibility of causing data loss is low and then raises the output rates, thereby being capable of completing the relay processing via the processing section more quickly. Consequently, in the on-vehicle network, the relay processing of the data can be performed efficiently while preventing data loss.

(2) Preferably, the processing section sets the output rates of the respective frames in the case that the transmission source addresses of the respective frames are different to the same value.

With this configuration, in a congested state, data can be relayed at the same speed to the devices having the respective transmission source addresses. Furthermore, since the output rate is not required to be changed for each frame, the adjustment processing can be simplified.

(3) Further preferably, in the case that the transmission source addresses of the respective frames are different, the processing section outputs the respective frames to the switch section according to the priority of the respective transmission source addresses.

With this configuration, for example, in a congested state in which the output rates are lowered, since frames to be relayed preferentially can be output to the switch section more quickly, the transmission delay of important data in the on-vehicle network can be further decreased.

(4) Preferably, the processing section sets the output rates of the respective frames in the case that the transmission source addresses of the respective frames are different to different values at all or some of the respective transmission source addresses.

With this configuration, in a congested state, since the frames can be output the switch section at the output rates according to the transmission source addresses, the frames can be transmitted according to flexible speed setting.

(5) A switch device according to another embodiment of the present disclosure is a switch device for relaying data in an on-vehicle network, being equipped with a switch section and a processing section for performing the relay processing via the switch section, wherein, in the case that a plurality of frames to be subjected to the relay processing is present in the processing section and when the transmission source addresses of the respective frames are different, the processing section performs adjustment processing for transmitting an instruction regarding the transmission timing of the frames to at least either one of the devices having the respective transmission source addresses.

In the case that the transmission source addresses of the respective frames are different as described above, in other words, in the case of a congested state, the degree of the congestion can be lowered or the congested state can be changed to a non-congested state by using a configuration in which, for example, a transmission delay request is transmitted to at least either one of the devices having the respective transmission source addresses, whereby data loss can be prevented without using a configuration in which the output rate of the data from the MCU to the L2 switch is lowered. Hence, in the on-vehicle network, the relay processing for the data can be performed efficiently while preventing data loss.

(6) Preferably, the processing section periodically confirms whether a plurality of frames to be subjected to the relay processing is present.

With this configuration, it is possible to confirm the presence of the plurality of frames to be subjected to the relay processing by using a simple polling system in which the confirmation is performed periodically.

(7) Preferably, the processing section performs the adjustment processing in the case that a predetermined number or more of frames to be subjected to the relay processing have been stored.

With this configuration, the adjustment processing can be performed by performing event-driven type processing in which the fact that a predetermined number or more of frames to be subjected to the relay processing have been stored is used as a trigger.

(8) A communication control method according to an embodiment of the present disclosure is a communication control method in a switch device being equipped with a switch section and a processing section for performing relay processing via the switch section, including the step of performing the relay processing via the switch section and the step of confirming whether a plurality of frames to be subjected to the relay processing is present in the processing section, wherein, in the step of performing the relay processing, in the case that a plurality of frames to be subjected to the relay processing is present in the processing section, adjustment processing is performed so that the output rates of the respective frames to the switch section in the case that the transmission source addresses of the respective frames are different are made smaller than the output rates in the case that the transmission source addresses of the respective frames are the same.

With this configuration, the processing section can judge whether the switch device incorporating the processing section is in a congested state on the basis of whether the transmission source addresses of the respective frames are the same. And then, in the case that the transmission source addresses of the respective frames are different, the processing section judges that the switch device is in a congested state in which there is a high possibility that the remaining capacity of the RAM will become scarce and then lowers the output rate, thereby being capable of preventing data loss. Furthermore, in the case that the transmission source addresses of the respective frames are the same, the processing section judges that the switch device is in a non-congested state in which the possibility of causing data loss is low and then raises the output rate, thereby being capable of completing the relay processing via the processing section more quickly. Consequently, in the on-vehicle network, the relay processing of the data can be performed efficiently while preventing data loss.

(9) A communication control method according to another embodiment of the present disclosure is a communication control method in a switch device being equipped with a switch section and a processing section for performing relay processing via the switch section, including the step of performing the relay processing via the switch section and the step of confirming whether a plurality of frames to be subjected to the relay processing is present in the processing section, wherein, in the step of performing the relay processing, in the case that a plurality of frames to be subjected to the relay processing is present in the processing section and when the transmission source addresses of the respective frames are different, adjustment processing is performed so that an instruction regarding the transmission timing of the frames is transmitted to at least either one of the devices having the respective transmission source addresses.

In the case that the transmission source addresses of the respective frames are different as described above, in other words, in the case of a congested state, the degree of the congestion can be lowered or the congested state can be changed to a non-congested state by using a configuration in which, for example, a transmission delay request is transmitted to at least either one of the devices having the respective transmission source addresses, whereby data loss can be prevented without using a configuration in which the output rate of the data from the MCU to the L2 switch is lowered. Hence, in the on-vehicle network, the relay processing for the data can be performed efficiently while preventing data loss.

(10) A computer readable non-transitory recording medium according to an embodiment of the present disclosure is the computer readable non-transitory recording medium recording a communication control program for use in a switch device for relaying data in an on-vehicle network and for making a computer function as a switch section and a processing section for performing the relay processing via the switch section, wherein, in the case that a plurality of frames to be subjected to the relay processing is present in the processing section, the processing section performs adjustment processing so that the output rates of the respective frames to the switch section in the case that the transmission source addresses of the respective frames are different are made smaller than the output rates in the case that the transmission source addresses of the respective frames are the same.

With this configuration, the processing section can judge whether the switch device incorporating the processing section is in a congested state on the basis of whether the transmission source addresses of the respective frames are the same. And then, in the case that the transmission source addresses of the respective frames are different, the processing section judges that the switch device is in a congested state in which there is a high possibility that the remaining capacity of the RAM will become scarce and then lowers the output rate, thereby being capable of preventing data loss. Furthermore, in the case that the transmission source addresses of the respective frames are the same, the processing section judges that the switch device is in a non-congested state in which the possibility of causing data loss is low and then raises the output rate, thereby being capable of completing the relay processing via the processing section more quickly. Consequently, in the on-vehicle network, the relay processing of the data can be performed efficiently while preventing data loss.

(11) A computer readable non-transitory recording medium according to another embodiment of the present disclosure is the computer readable non-transitory recording medium recording a communication control program for use in a switch device for relaying data in an on-vehicle network and for making a computer function as a switch section and a processing section for performing the relay processing via the switch section, wherein, in the case that a plurality of frames to be subjected to the relay processing is present in the processing section and when the transmission source addresses of the respective frames are different, the processing section performs adjustment processing for transmitting an instruction regarding the transmission timing of the frames to at least either one of the devices having the respective transmission source addresses.

In the case that the transmission source addresses of the respective frames are different as described above, in other words, in the case of a congested state, the degree of the congestion can be lowered or the congested state can be changed to a non-congested state by using a configuration in which, for example, a transmission delay request is transmitted to at least either one of the devices having the respective transmission source addresses, whereby data loss can be prevented without using a configuration in which the output rate of the data from the MCU to the L2 switch is lowered. Hence, in the on-vehicle network, the relay processing for the data can be performed efficiently while preventing data loss.

The embodiments of the present disclosure will be described below referring to the drawings. The same or equivalent components in the drawings are designated by the same reference numerals and signs, and the descriptions thereof are not repeated. Furthermore, at least portions of the embodiments described below may be combined arbitrarily.

FIRST EMBODIMENT

[Configuration and Basic Operation]

FIG. 1 is a view showing a configuration of an on-vehicle communication system according to a first embodiment of the present disclosure.

Referring to FIG. 1, an on-vehicle communication system 301 is equipped with a switch device 101 and a plurality of on-vehicle communication devices 111. The on-vehicle communication system 301 is mounted on a vehicle 1.

The on-vehicle communication devices 111 are, for example, a TCU (Telematics Communication Unit), a central gateway (CGW), a human-machine interface, a camera, a sensor, a driving assist device and a navigation device, and the devices can communicate with the switch device 101.

The connection relationship between the switch device 101 and each of the on-vehicle communication devices 111 in the on-vehicle network of the vehicle 1 is, for example, fixed.

The switch device 101 and the on-vehicle communication devices 111 are connected mutually, for example, by on-vehicle Ethernet (registered trademark) communication cables (hereafter also referred to as Ethernet cables).

The switch device 101 mutually communicates with the on-vehicle communication devices 111 using the Ethernet cables. Between the switch device 101 and the on-vehicle communication devices 111, information exchange is performed, for example, by using Ethernet frames conforming to the IEEE 802.3. The transmission speed of the Ethernet frames is, for example, 100 Mbps (Megabits per second).

Figure 2:
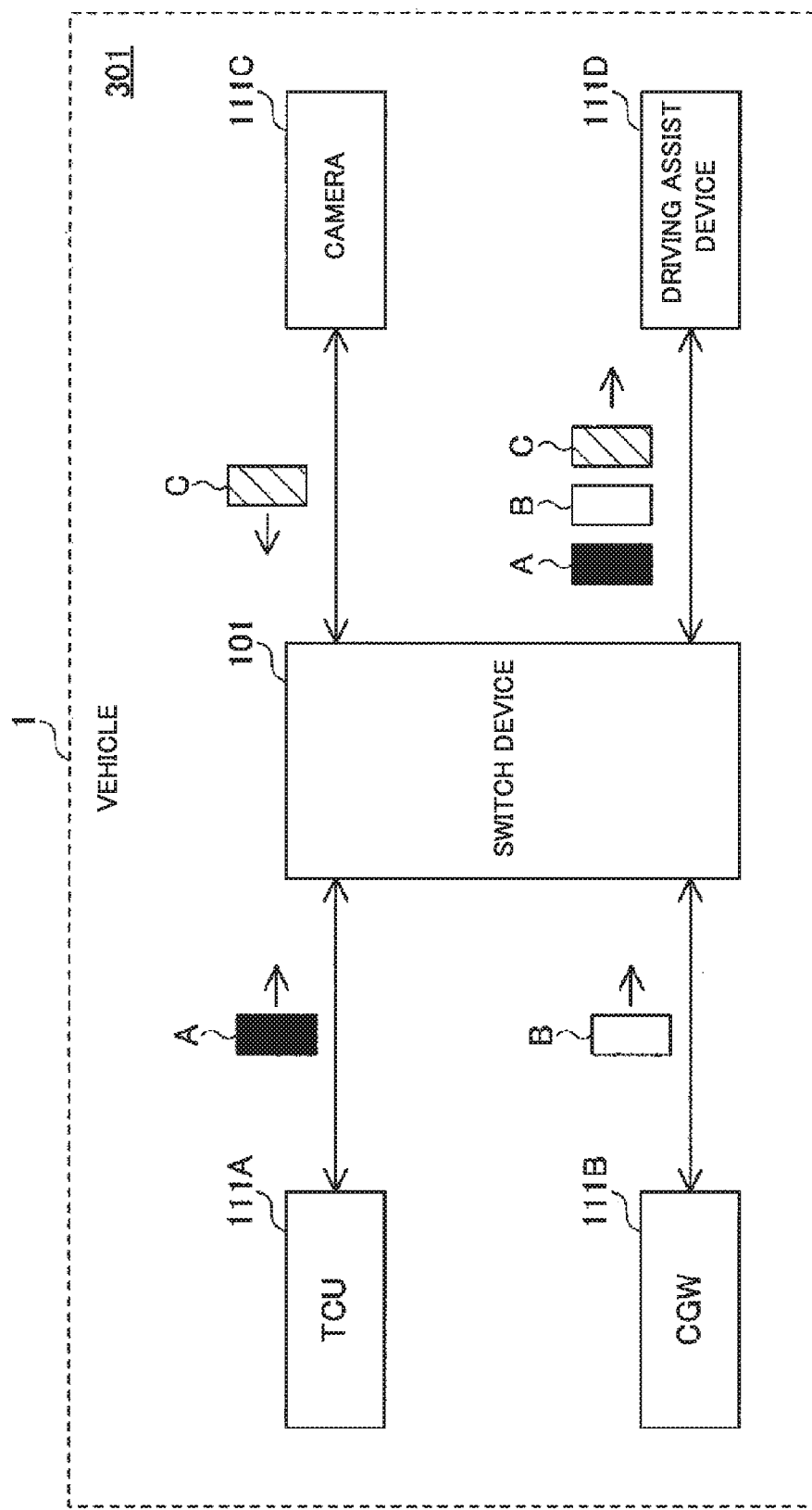
FIG. 2 is a view showing an application example of the on-vehicle communication system according to the first embodiment of the present disclosure.

FIG. 2 is a view showing an application example of the on-vehicle communication system according to the first embodiment of the present disclosure. FIG. 2 shows a TCU 111A, a CGW 111B, a camera 111C and a driving assist device 111D as specific examples of the on-vehicle communication devices 111.

However, the on-vehicle communication system 301 is not limited to have the configuration equipped with the four on-vehicle communication devices 111, but may also has a configuration equipped with three or five or more on-vehicle communication devices 111.

In the on-vehicle network, the TCU 111A, the CGW 111B, the camera 111C and the driving assist device 111D belong to, for example, subnets being different mutually.

In the on-vehicle network, information is transmitted and received using IP packets according to the IP protocol. The IP packets are stored in Ethernet frames and transmitted.

The switch device 101 is a switch device for performing data relay processing in the on-vehicle network.

More specifically, the switch device 101 relays Ethernet frames to be transmitted among the TCU 111A, the CGW 111B, the camera 111C and the driving assist device 111D.

In detail, the switch device operates according to a communication protocol having a plurality of layers. In more detail, the switch device 101 can function as an L2 (layer 2) switch and relays Ethernet frames to be transmitted among the on-vehicle communication devices 111 belonging to the same subnet.

In this example, the switch device 101 relays Ethernet frames to be transmitted between the camera 111C and the driving assist device 111D.

Furthermore, the switch device 101 can also function as an L3 (layer 3) relay device and relays Ethernet frames to be transmitted among the on-vehicle communication devices 111 belonging to different subnets.

In this example, the switch device 101 relays Ethernet frames to be transmitted among the TCU 111A, the camera 111C and the driving assist device 111D; Ethernet frames to be transmitted among the CGW 111B, the camera 111C and the driving assist device 111D; and Ethernet frames to be transmitted between the TCU 111A and the CGW 111B.

The TCU 111A can perform wireless communication with a wireless base station device, not shown, according to a communication standard, such as LTE (Long Term Evolution) or 3G.

In this example, the TCU 111A relays map information that is transmitted from a server providing the map information to the driving assist device 111.

In more detail, upon receiving the wireless frames storing the IP packets including the map information from the wireless base station, the TCU 111A acquires the IP packets from the received wireless frames and stores the acquired IP packets in the Ethernet frames.

In the IP packets from the server, for example, the IP address of the server and the IP address of the driving assist device 111D are herein included as the transmission source IP address and the transmission destination IP address, respectively.

Since the TCU 111A itself and the driving assist device 111D belong to subnets being different from each other, the TCU 111A writes the MAC address of the switch device 101 serving as the default gateway and its own MAC address as the transmission destination MAC address and the transmission source MAC address, respectively, in the Ethernet frames.

The Ethernet frames requiring L3 relay in the switch device 101 are hereafter also referred to as high-order relay frames. Furthermore, the high-order relay frames to be transmitted from the TCU 111A are also referred to as high-order relay frames A.

Moreover, for example, priority can be set to Ethernet frames. More specifically, in the Ethernet frames, a three-bit value indicating priority is stored in the PCP (Priority Code Point) region. In this example, a value 7 indicating the highest priority level is stored in the high-order relay frames A.

The TCU 111A transmits the high-order relay frames A in which the IP packets from the server are stored to the switch device 101.

The CGW 111B can communicate with, for example, control devices, such as an engine control device, an AT (Automatic Transmission) control device, an HEV (Hybrid Electric Vehicle) control device, a brake control device, a chassis control device, a steering control device, an instrument display control device and a theft detection device, via a CAN (Controller Area Network).

The CGW 111B performs relay processing of information that is exchanged between a control device and another on-vehicle communication device 111.

In this example, the CGW 111B relays, for example, speed information that is transmitted from a control device for measuring the speed information to the driving assist device 111.

In more detail, upon receiving a message including the speed information from the control device, the CGW 111B acquires the speed information from the received message, creates IP packets including the acquired speed information, and stores the IP packets in the Ethernet frames.

In the IP packets, for example, the IP address of the CGW 111B and the IP address of the driving assist device 111D are included as the transmission source IP address and the transmission destination IP address, respectively.

Like the TCU 111A, since the CGW 111B itself and the driving assist device 111D belong to subnets being different from each other, the CGW 111B writes the MAC address of the switch device 101 serving as the default gateway and its own MAC address as the transmission destination MAC address and the transmission source MAC address, respectively, in the Ethernet frames.

The high-order relay frames to be transmitted from the CGW 111B are hereafter also referred to as high-order relay frames B. In this example, a value 6 indicating the second highest priority level is stored in the high-order relay frames B.

The CGW 111B transmits the high-order relay frames B in which the IP packets including the speed information are stored to the switch device 101.

The camera 111C can, for example, photograph an image or video around the vehicle 1 incorporating the camera 111C. In more detail, the camera 111C, for example, periodically photographs an image around the vehicle 1 incorporating the camera 111C, creates IP packets including the image information indicating the photographed image, and stores the IP packets in the Ethernet frames.

For example, the IP address of the camera 111C and the IP address of the driving assist device 111D are included as the transmission source IP address and the transmission destination IP address, respectively, in the IP packets.

Unlike the TCU 111A and the CGW 111B, since the camera 111C itself and the driving assist device 111D belong to the same subnet, the camera 111C writes the MAC address of the driving assist device 111D and its own MAC address as the transmission destination MAC address and the transmission source MAC address, respectively, in the Ethernet frames.

Ethernet frames not requiring L3 relay in the switch device 101 are hereafter also referred to as low-order relay frames. Furthermore, the low-order relay frames to be transmitted from the camera 111C are also referred to as low-order relay frames C.

The camera 111C transmits the low-order relay frames C in which the IP packets including the image information are stored to the switch device 101.

Upon receiving the high-order relay frames A from the TCU 111A, the switch device 101 performs L3 relay processing for the received high-order relay frames A, thereby transmitting the high-order relay frames A to the driving assist device 111D.

Upon receiving the high-order relay frames B from the CGW 111B, the switch device 101 performs L3 relay processing for the received high-order relay frames B, thereby transmitting the high-order relay frames B to the driving assist device 111D.

Upon receiving the low-order relay frames C from the camera 111C, the switch device 101 performs L2 relay processing for the received low-order relay frames C, thereby transmitting the low-order relay frames C to the driving assist device 111D.

The driving assist device 111D acquires, for example, the map information, the speed information and the image information from the high-order relay frames A, the high-order relay frames B and the low-order relay frames C having been received from the TCU 111A, the CGW 111B and the camera 111C via the switch device 101, respectively.

The driving assist device 111D assists the driving of the vehicle 1 incorporating the driving assist device 111D on the basis of the acquired map information, speed information and image information.

[Configuration of the Switch Device 101]

Figure 3:
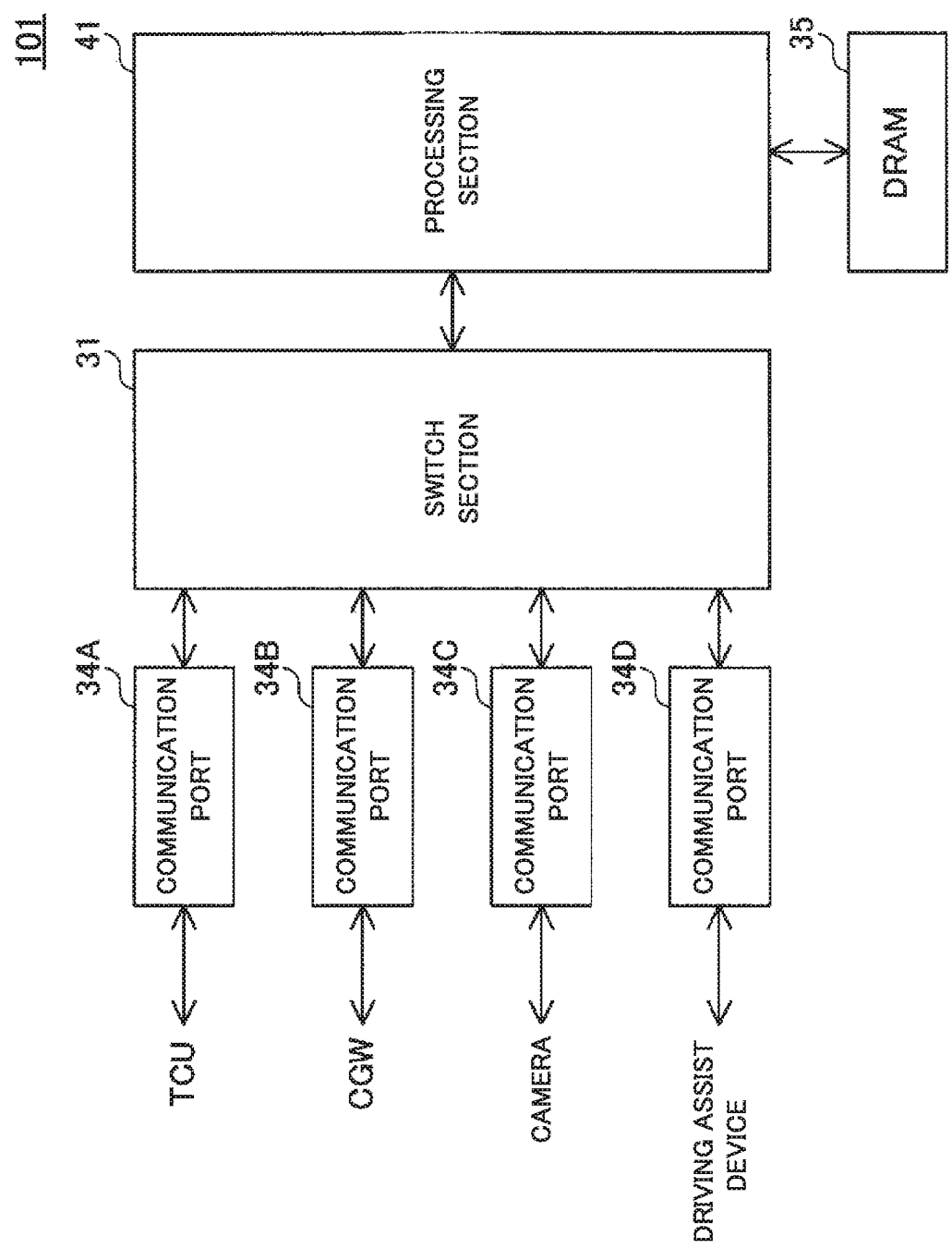
FIG. 3 is a view showing a configuration of a switch device in the on-vehicle communication system according to the first embodiment of the present disclosure.

FIG. 3 is a view showing a configuration of the switch device in the on-vehicle communication system according to the first embodiment of the present disclosure.

Referring to FIG. 3, the switch device 101 is equipped with a switch section 31, communication ports 34A, 34B, 34C and 34D, a DRAM (Dynamic RAM) 35 and a processing section 41.

Each of the communication ports 34A, 34B, 34C and 34D is hereafter also referred to as a communication port 34. A unique port number is assigned to each communication port 34.

However, the switch device 101 is not limited to have the configuration equipped with the four communication ports 34, but may also has a configuration equipped with three or five or more communication ports 34.

The communication ports 34 are connected to the on-vehicle communication devices 111 via Ethernet cables. In this example, the communication ports 34A, 34B, 34C and 34D are connected to the TCU 111A, the CGW 111B, the camera 111C and the driving assist device 111D via the Ethernet cables, respectively.

Each communication port 34, for example, receives Ethernet frames from the on-vehicle communication device 111 connected thereto and performs frame processing, such as the filtering processing of the received Ethernet frames. After that, the communication port 34 outputs the processed Ethernet frames to the switch section 31.

Furthermore, the communication port 34 receives Ethernet frames from the switch section 31 and transmits the received Ethernet frames to the on-vehicle communication device 111 connected thereto.

The switch section 31 can perform relay processing without passing through the processing section 41 according to L2, one of L2 and L3.

In detail, the switch section 31 operates as an L2 switch and performs the relay processing of the Ethernet frames.

In more detail, upon receiving the Ethernet frames from the communication port 34, the switch section 31 refers to the transmission destination MAC address included in the received Ethernet frames.

The switch section 31, for example, holds an ARL (Address Resolution Logic) table indicating the correspondence relationship between a transmission destination MAC address and an output destination for each subnet.

The content of the ARL table has been determined in advance, for example, by the user on the basis of the connection relationship having been fixed as described above.

In detail, the output destination in the ARL table indicates either the port number of the communication port 34 connected to the same subnet or the processing section 41. In more detail, the output destination of the low-order relay frames to be transmitted in the same subnet indicates the port number of the communication port 34. On the other hand, the output destination of the high-order relay frames to be transmitted between the subnets being different from each other indicates the processing section 41.

The switch section 31 acquires the output destination corresponding to the referred transmission destination MAC address from the ARL table and outputs the received Ethernet frames to the acquired output destination.

More specifically, for the low-order relay frames, the switch section 31 acquires the port number corresponding to the referred transmission destination MAC address from the ARL table as the output destination and transmits the received Ethernet frames to the on-vehicle communication device 111 via the communication port 34 corresponding to the acquired port number.

Furthermore, for the high-order relay frames, the switch section 31 acquires the processing section 41 from the ARL table as the output destination and outputs the received Ethernet frames to the processing section 41.

Moreover, upon receiving the Ethernet frames from the processing section 41, the switch section 31 refers to the transmission destination MAC address included in the received Ethernet frames.

The switch section 31 acquires the port number corresponding to the referred transmission destination MAC address from the ARL table as the output destination and transmits the Ethernet frames received from the processing section 41 to the on-vehicle communication device 111 via the communication port 34 corresponding to the acquired port number.

The processing section 41 performs relay processing according to L3 higher than L2. The details of the relay processing in the processing section 41 will be described later.

[Configuration of a Comparison Example of the Switch Device]

Figure 4:
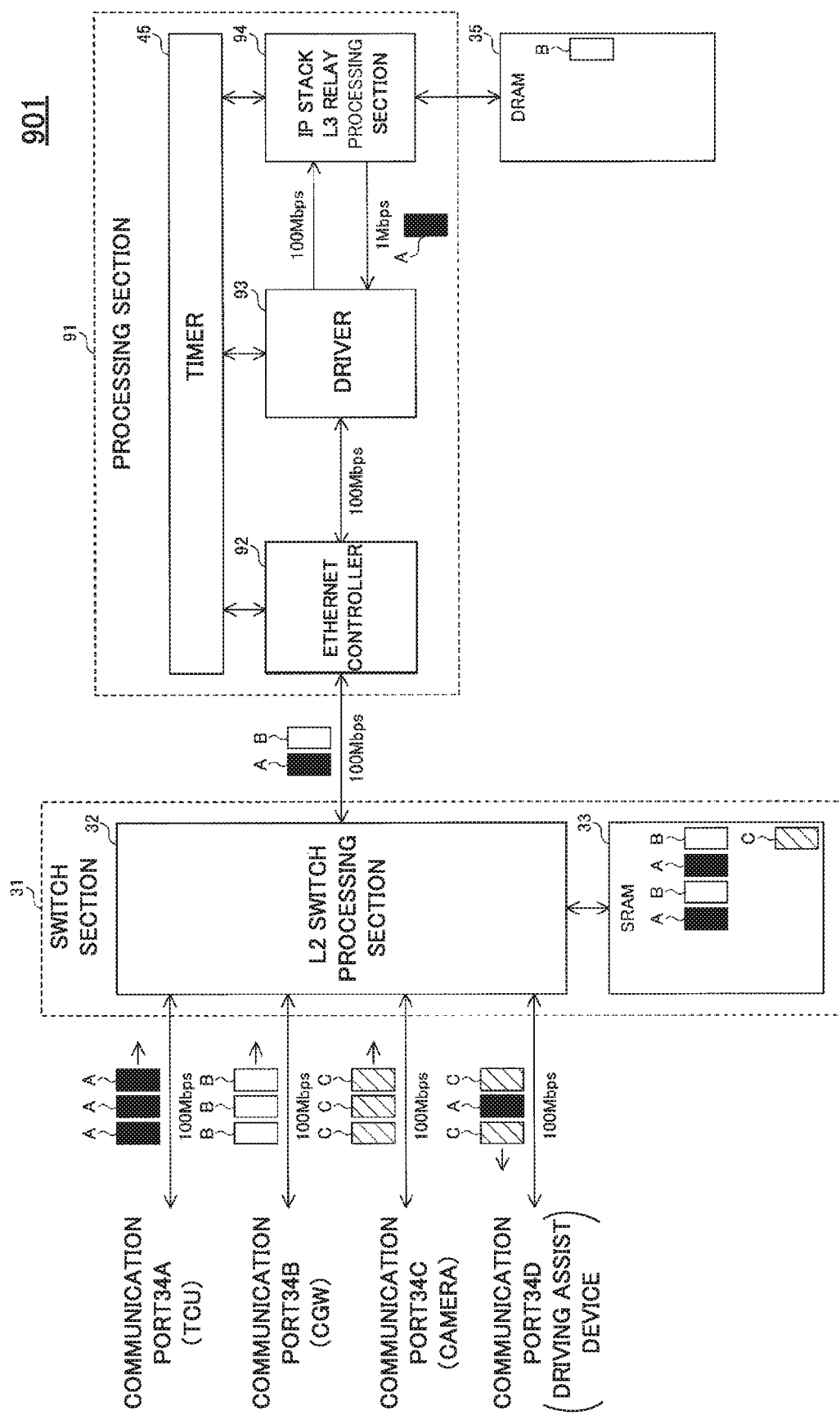
FIG. 4 is a view showing a detailed configuration of a comparison example of the switch device.

FIG. 4 is a view showing a detailed configuration of a comparison example of the switch device. FIG. 4 shows a state in which the high-order relay frames A and B are congested in the comparison example of the switch device.

Referring to FIG. 4, a switch device 901 serving as a comparison example of the switch device 101 is equipped with the switch section 31, the DRAM 35 and a processing section 91. The switch section 31 includes an L2 switch processing section 32 and an SRAM (Static RAM) 33. The processing section 91 includes a timer 45, an Ethernet controller 92, a driver 93 and an IP stack L3 relay processing section 94.

The storage capacity of the SRAM 33 is smaller than, for example, the storage capacity of the DRAM 35. More specifically, the storage capacities of the SRAM 33 and the DRAM 35 are 128 kilobytes and 128 megabytes, respectively.

Upon receiving the low-order relay frames C from the camera 111C via the communication port 34C, the L2 switch processing section 32 in the switch section 31 transmits the received low-order relay frames C to the driving assist device 111D via the communication port 34D. The transmission speed of the low-order relay frames C is 100 Mbps.

Furthermore, upon receiving the high-order relay frames A via the communication port 34A, the L2 switch processing section 32 outputs the received high-order relay frames A to the processing section 91.

Upon receiving the high-order relay frames A from the L2 switch processing section 32, the Ethernet controller 92 in the processing section 91 outputs the received high-order relay frames A to the driver 93.

Upon receiving the high-order relay frames A from the Ethernet controller 92, the driver 93 outputs the received high-order relay frames A to the IP stack L3 relay processing section 94.

Upon receiving the high-order relay frames A from the driver 93, the IP stack L3 relay processing section 94 performs L3 relay processing for rewriting the transmission destination MAC address and the transmission source MAC address of the received high-order relay frames A.

In more detail, the IP stack L3 relay processing section 94, for example, holds a routing table indicating the correspondence relationship between transmission destination networks and transmission interfaces. Furthermore, the IP stack L3 relay processing section 94, for example, holds an ARP (Address Resolution Protocol) table indicating the correspondence relationship between an IP address and a MAC address for each transmission interface.

Upon receiving the high-order relay frames A from the driver 93, the IP stack L3 relay processing section 94 acquires the transmission destination IP address from the IP packets included in the received high-order relay frames A, that is, the IP address of the driving assist device 111D in this case, and then performs, for example, subnet mask calculation for the acquired transmission destination IP address, thereby specifying the transmission destination network.

The IP stack L3 relay processing section 94 refers to the routing table and specifies the transmission interface corresponding to the specified transmission destination network.

And then, the IP stack L3 relay processing section 94 refers to the ARP table corresponding to the specified transmission interface and acquires the MAC address corresponding to the transmission destination IP address, that is, the MAC address of the driving assist device 111D in this case, from the ARP table.

The IP stack L3 relay processing section 94 rewrites the transmission destination MAC address and the transmission source MAC address of the high-order relay frames A to the MAC address of the driving assist device 111D and the MAC address of the switch device 101 incorporating the IP stack L3 relay processing section 94 and outputs the high-order relay frames A to the driver 93.

Upon receiving the high-order relay frames A from the IP stack L3 relay processing section 94, the driver 93 outputs the received high-order relay frames A to the Ethernet controller 92.

Upon receiving the high-order relay frames A from the driver 93, the Ethernet controller 92 outputs the received high-order relay frames A to the switch section 31.

Upon receiving the high-order relay frames A from the Ethernet controller 92, the L2 switch processing section 32 in the switch section 31 transmits the received high-order relay frames A to the driving assist device 111D via the communication port 34D.

The high-order relay frames B to be transmitted from the CGW 111B to the driving assist device 111D via the switch device 101 are processed in the switch section 31 and the processing section 91 in a similar way that the high-order relay frames A are processed.

Figure 5:
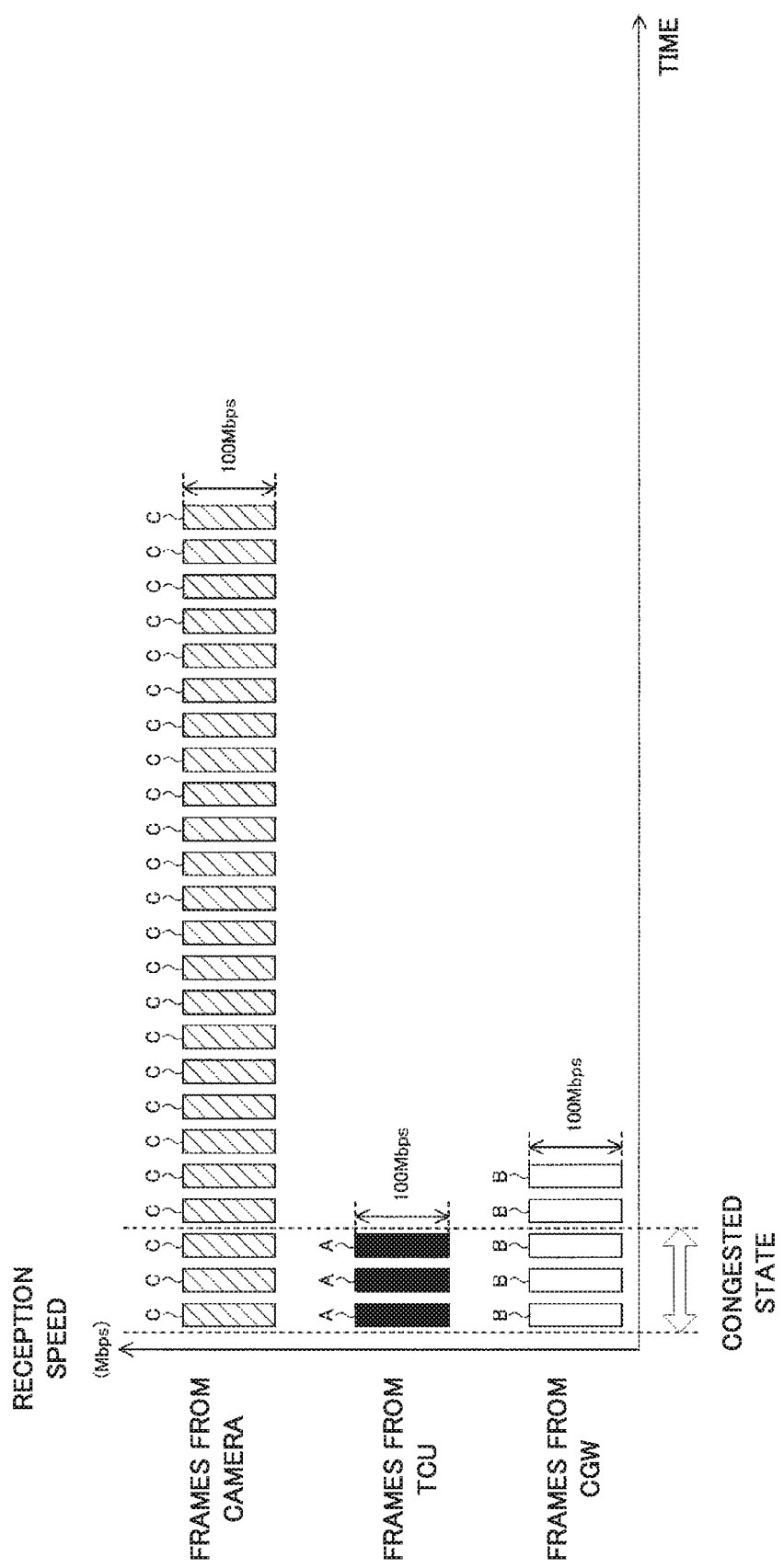
FIG. 5 is a view showing an example of a time chart indicating the time when the comparison example of the switch device receives high-order relay frames and low-order relay frames.

FIG. 5 is a view showing an example of a time chart indicating the time when the comparison example of the switch device receives the high-order relay frames and the low-order relay frames. In FIG. 5, the horizontal axis represents time and the vertical axis represents reception speed.

Referring to FIGS. 4 and 5, for example, the following problems may occur in the case that the transmission speeds of the high-order relay frames A and B between the L2 switch processing section 32 and the Ethernet controller 92, between the Ethernet controller 92 and the driver 93, and between the driver 93 and the IP stack L3 relay processing section 94 are 100 Mbps.

In other words, for example, if a congested state occurs in which the L2 switch processing section 32 receives the high-order relay frames A, the high-order relay frames B and the low-order relay frames C in parallel from the communication ports 34A, 34B and 34C, respectively, the L2 switch processing section 32 stores, in the SRAM 33, the Ethernet frames to be processed later among the received high-order relay frames and the received low-order relay frames.

However, since the storage capacity of the SRAM 33 is not large, if the remaining capacity of the SRAM 33 becomes scarce, the L2 switch processing section 32 discards the Ethernet frames that cannot be stored. In other words, if a congested state occurs, there is a high possibility that frame loss occurs.

The remaining capacity of the SRAM 33 is requested to be made larger as much as possible to suppress the occurrence of frame loss.

On the other hand, in the processing section 91 in the switch device 901, a method is conceived in which the output rates of the high-order relay frames from the IP stack L3 relay processing section 94 to the driver 93 are limited to, for example, 1 Mbps.

Figure 6:
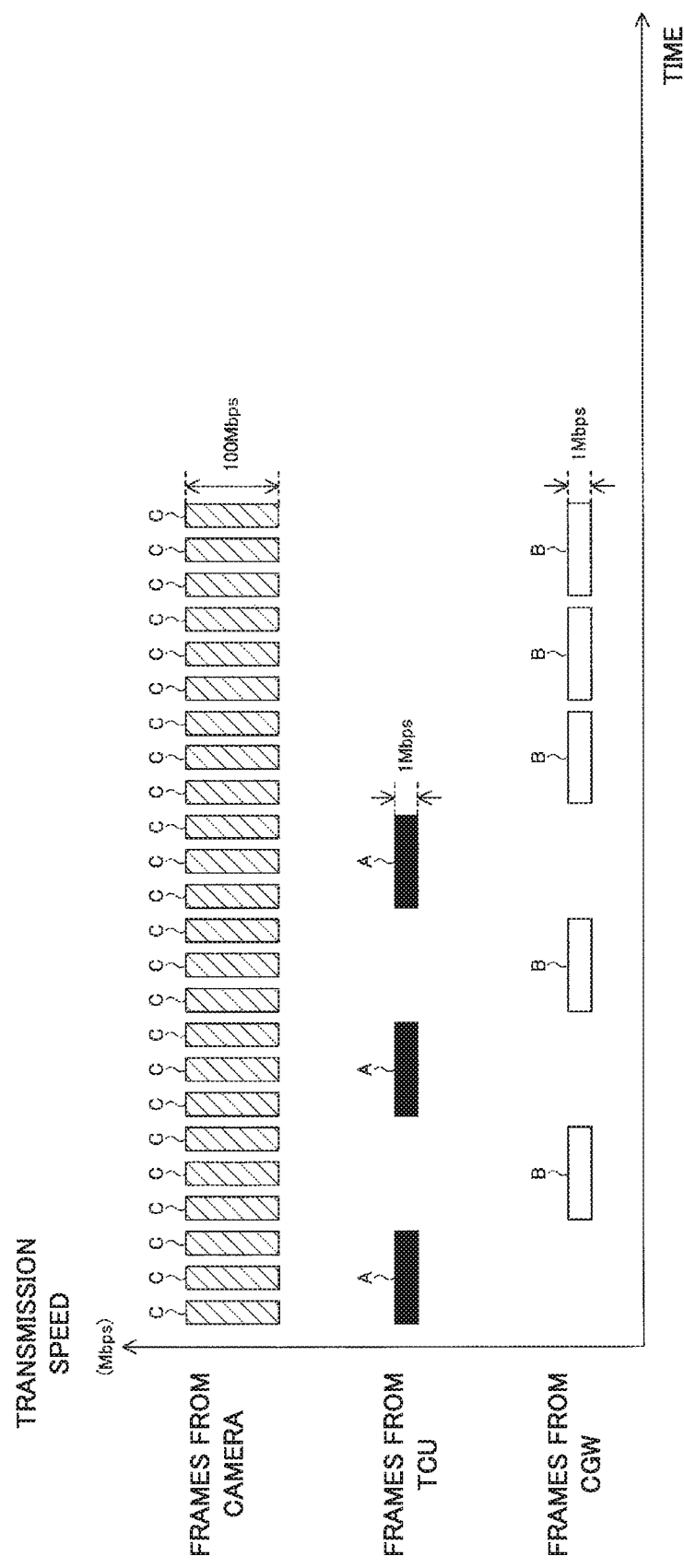
FIG. 6 is a view showing an example of a time chart indicating the time when the comparison example of the switch device transmits the high-order relay frames and the low-order relay frames.

FIG. 6 is a view showing an example of a time chart indicating the time when the comparison example of the switch device transmits the high-order relay frames and the low-order relay frames. In FIG. 6, the horizontal axis represents time and the vertical axis represents transmission speed.

Referring to FIGS. 4 and 6, upon receiving, for example, the high-order relay frames A and B in this order from the driver 93 at a transmission speed of 100 Mbps, the IP stack L3 relay processing section 94 performs L3 relay processing in the order of the reception.

Since the output rates of the high-order relay frames to the driver 93 are herein limited to 1 Mbps, the IP stack L3 relay processing section 94 takes time for the transmission of the high-order relay frames A.

The IP stack L3 relay processing section 94, for example, temporarily stores the high-order relay frames B in the DRAM 35 until the transmission of the high-order relay frames A to the driver 93 is completed, acquires the high-order relay frames B from the DRAM 35 after the completion of the output of the high-order relay frames A, and then performs L3 relay processing. After that, the IP stack L3 relay processing section 94 outputs the high-order relay frames B having been subjected to the L3 relay processing to the driver 93.

With this configuration, in a congested state, the high-order relay frames can be stored in the DRAM 35 having a capacity larger than that of the SRAM 33, whereby it is possible to reduce the possibility that the remaining capacity of the SRAM 33 will become scarce and frame loss will occur.

What's more, since the output rates of the high-order relay frames from the IP stack L3 relay processing section 94 are limited to 1 Mbps, the transmission speeds of the high-order relay frames A and B from the switch device 101 are also limited to 1 Mbps as shown in FIG. 6.

[Problem]

Figure 7:
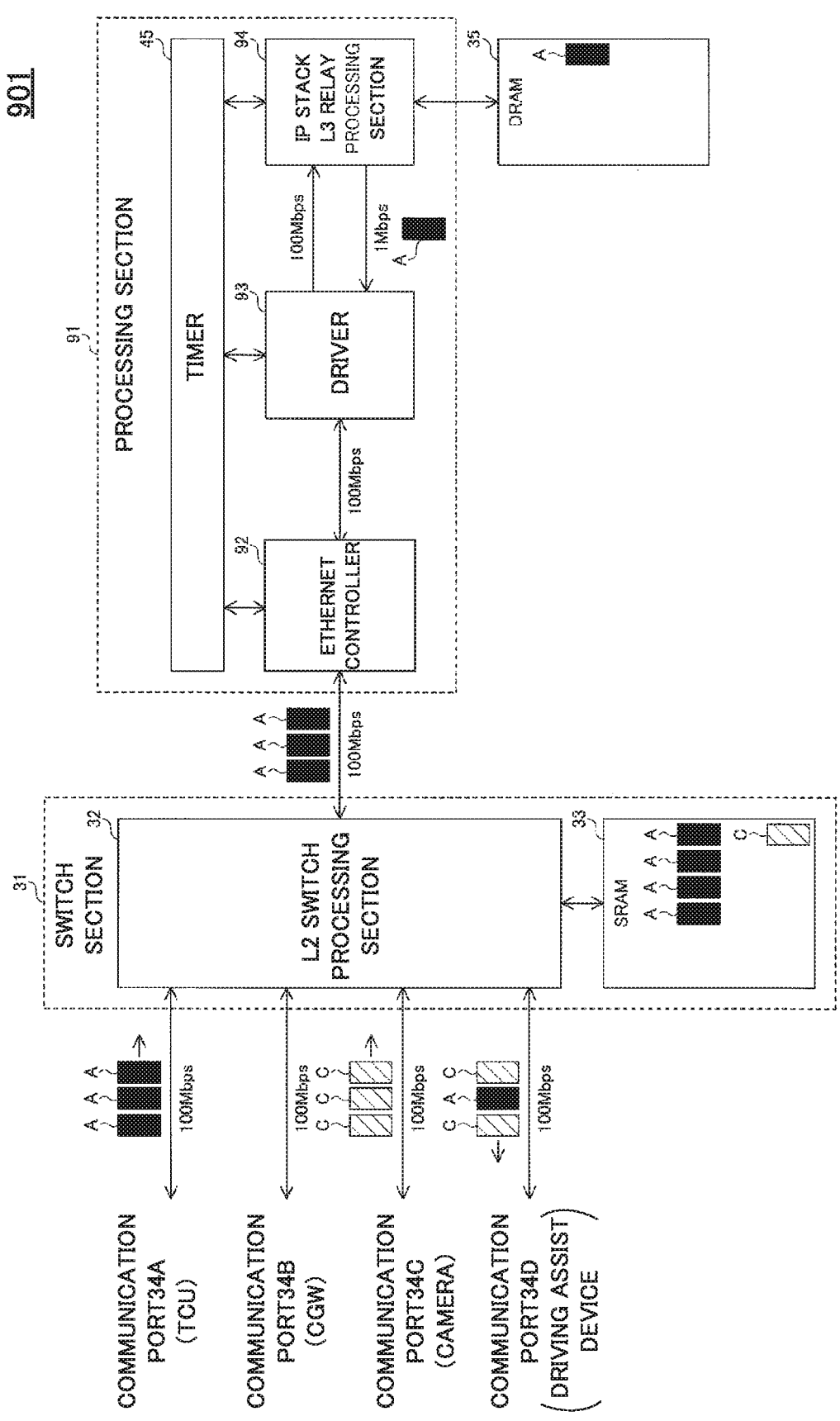
FIG. 7 is a view showing a detailed configuration of the comparison example of the switch device.

FIG. 7 is a view showing a detailed configuration of the comparison example of the switch device. FIG. 7 shows a state in which the high-order relay frames A and B are not congested in the comparison example of the switch device. The way in which the configuration is viewed in FIG. 7 is similar to the way in which the configuration is viewed in FIG. 4.

Figure 8:
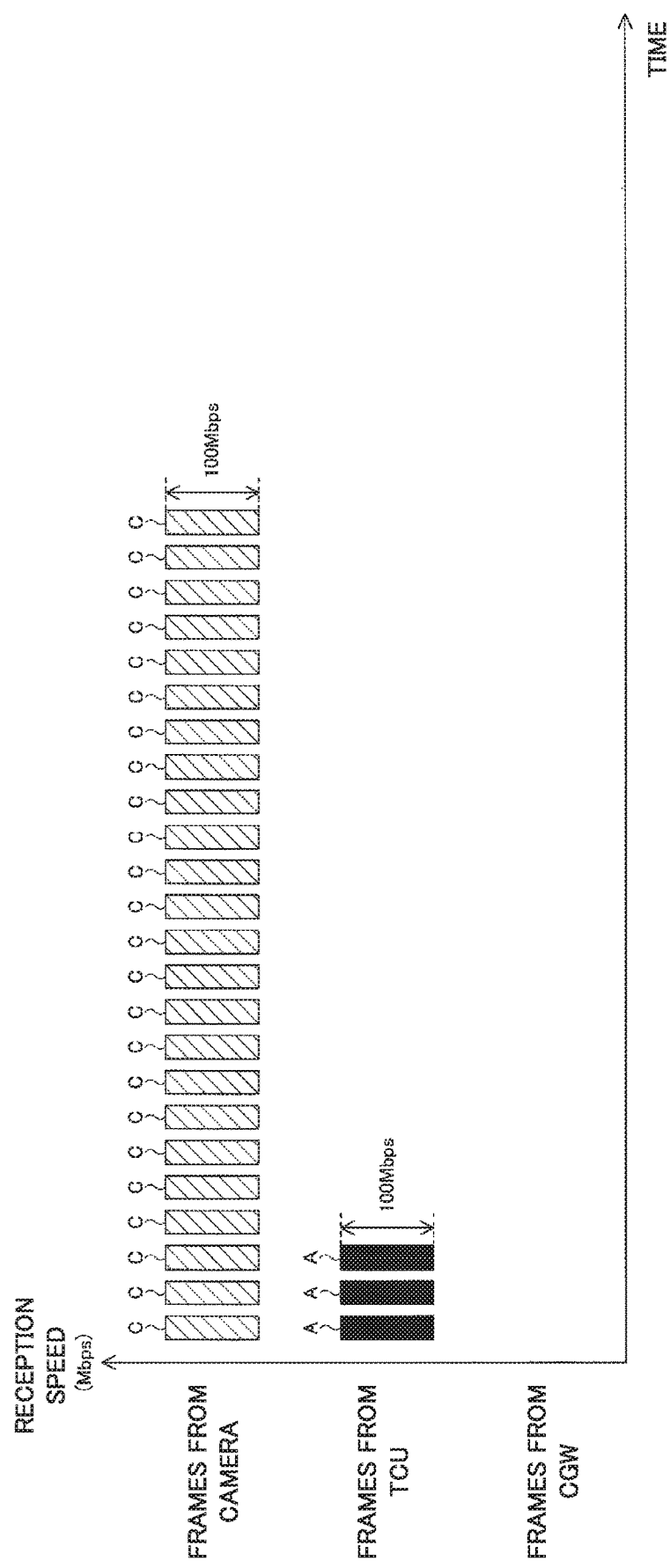
FIG. 8 is a view showing an example of a time chart indicating the time when the comparison example of the switch device receives the high-order relay frames and the low-order relay frames.

FIG. 8 is a view showing an example of a time chart indicating the time when the comparison example of the switch device receives the high-order relay frames and the low-order relay frames. In FIG. 8, the horizontal axis represents time and the vertical axis represents reception speed.

Referring to FIGS. 7 and 8, since the switch device 101 does not receive the high-order relay frames A and B in parallel unlike the case shown in FIG. 5, even if the switch device 101 receives the high-order relay frames A and the low-order relay frames C in parallel, there is a high possibility that relay processing can be performed without causing frame loss.

Figure 9:
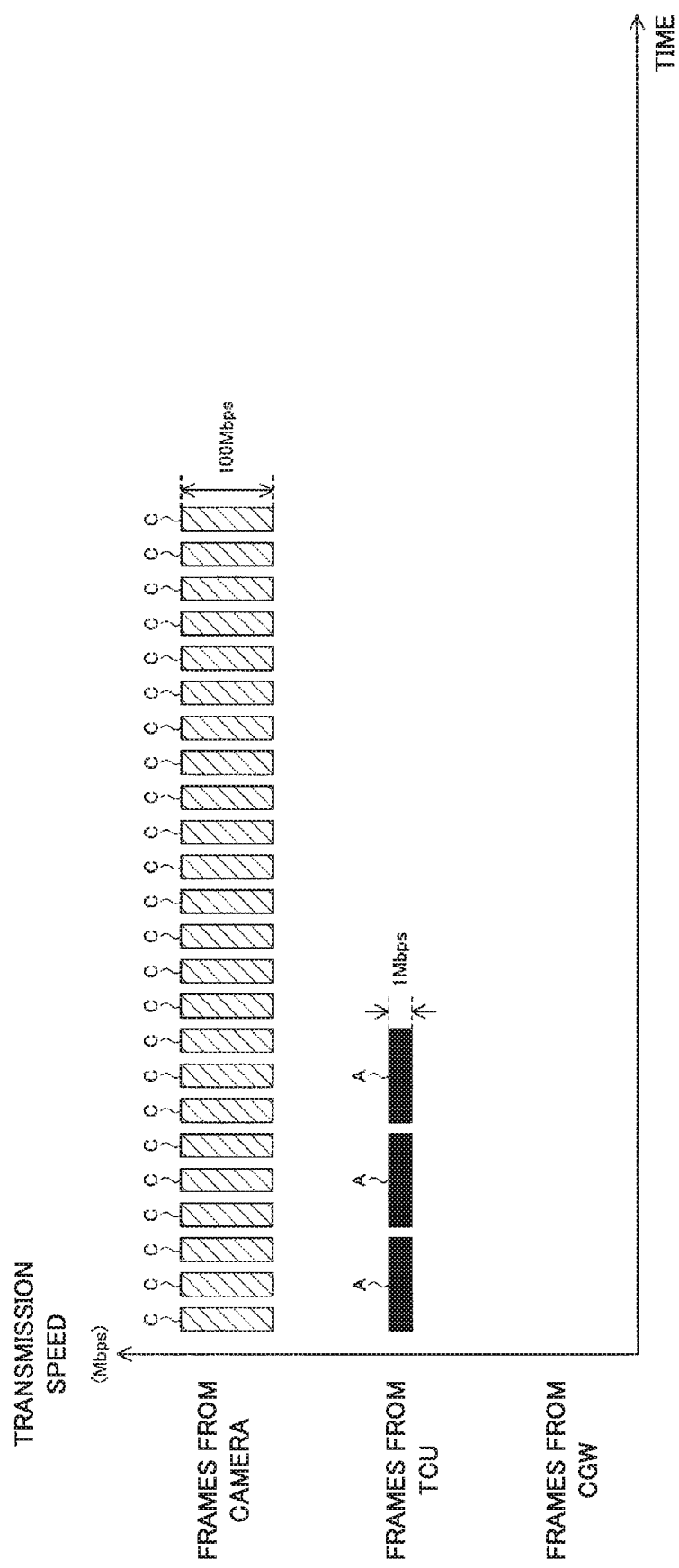
FIG. 9 is a view showing an example of a time chart indicating the time when the comparison example of the switch device transmits the high-order relay frames and the low-order relay frames.

FIG. 9 is a view showing an example of a time chart indicating the time when the comparison example of the switch device transmits the high-order relay frames and the low-order relay frames. In FIG. 9, the horizontal axis represents time and the vertical axis represents transmission speed.

Referring to FIGS. 7 and 9, since the output rate of the high-order relay frames A from the IP stack L3 relay processing section 94 is limited to 1 Mbps as described above, there is a high possibility that relay processing can be performed without causing frame loss, but the transmission speed of the high-order relay frames A from the switch device 101 is limited to 1 Mbps as shown in FIG. 9.

A technology capable of improving the transmission speeds of the high-order relay frames while enhancing the possibility of successfully performing relay processing without causing frame loss is required.

Hence, in the switch device according to the embodiment of the present disclosure, this problem is solved by using the configuration and by performing operation as described below.

[Configuration of the Switch Device 101]

Figure 10:
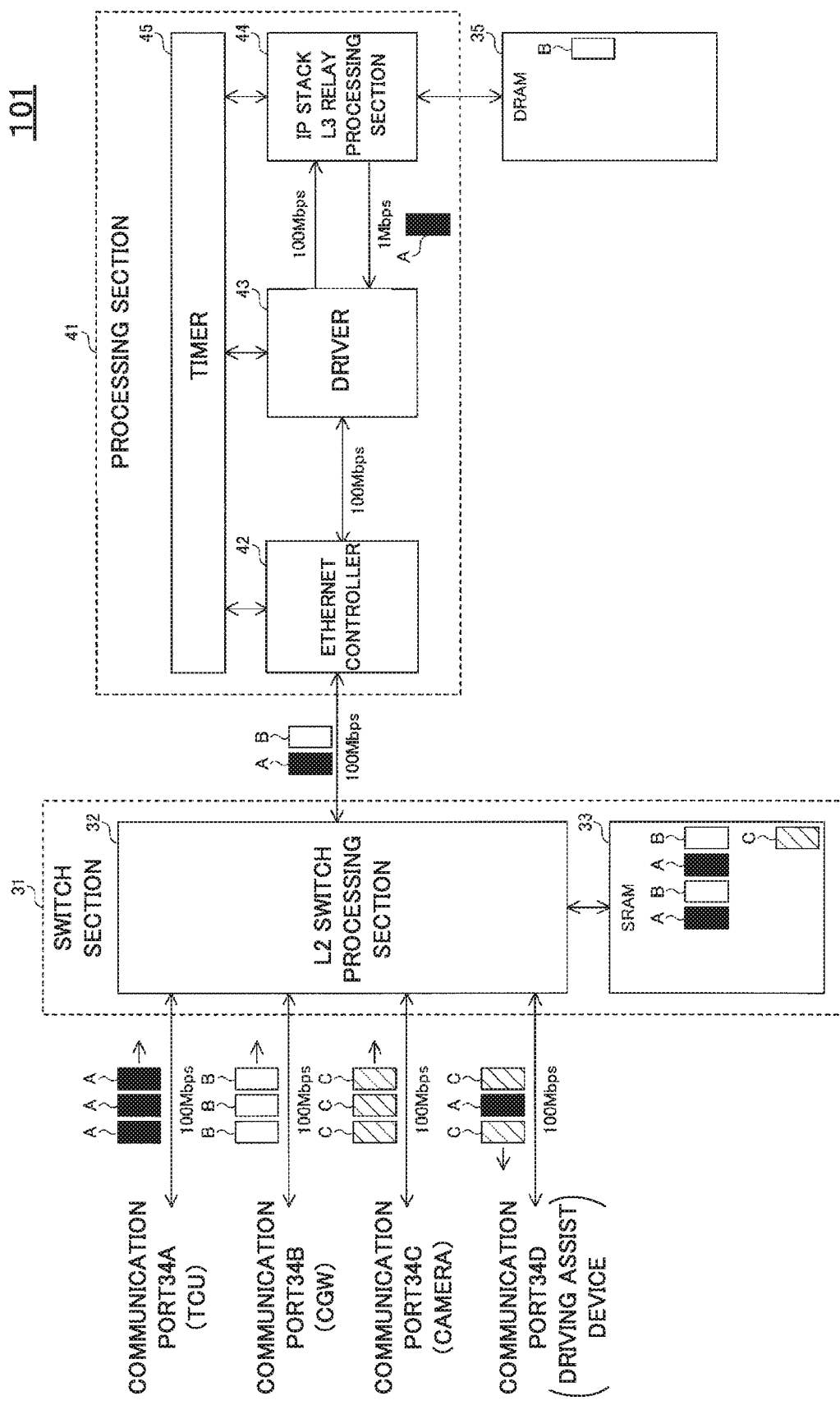
FIG. 10 is a view showing a detailed configuration of the switch device according to the first embodiment of the present disclosure.

FIG. 10 is a view showing a detailed configuration of the switch device according to the first embodiment of the present disclosure. FIG. 10 shows a state in which the high-order relay frames A and B are congested in the switch device 101.

Referring to FIG. 10, the switch section 31 in the switch device 101 includes the L2 switch processing section 32 and the SRAM 33. The processing section 41 includes an Ethernet controller 42, a driver 43, an IP stack L3 relay processing section 44 and the timer 45.

In this example, as in the case shown in FIG. 5, the switch device 101 is in a congested state in which the L2 switch processing section 32 receives the high-order relay frames A, the high-order relay frames B and the low-order relay frames C in parallel from the communication ports 34A, 34B and 34C, respectively.

The operations of the L2 switch processing section 32 and the SRAM 33 in the switch device 101 are similar to those of the L2 switch processing section 32 and the SRAM 33 in the switch device 901 shown in FIG. 4, respectively.

The high-order relay frames are transmitted at a transmission speed of 100 Mbps between the L2 switch processing section 32 and the Ethernet controller 42 and between the Ethernet controller 42 and the driver 43.

The driver 43 outputs the high-order relay frames to the IP stack L3 relay processing section 44 at a transmission speed of 100 Mbps.

The Ethernet controller 42, the driver 43 and the IP stack L3 relay processing section 44 in the processing section 41 can use the timer 45.

[Polling System]

The processing section 41, for example, periodically confirms whether a plurality of Ethernet frames, i.e., a plurality of high-order relay frames, to be subjected to relay processing is present according to a polling system.

In more detail, upon receiving high-order relay frames from the switch device 31, the Ethernet controller 42 in the processing section 41 temporarily stores the received high-order relay frames.

The driver 43 sets a standby time Tw in the timer 45. The timer 45 operates according to the setting value of the driver 43, and when the standby time expires, the timer 45 notifies the expiration to the driver 43.

Upon receiving the notification indicating the expiration from the timer 45, the driver 43 confirms the number of the high-order relay frames stored in the Ethernet controller 42.

In the case that two or more high-order relay frames have been stored in the Ethernet controller 42, the driver 43 acquires the stored high-order relay frames from the Ethernet controller 42 and outputs the high-order relay frames to the IP stack L3 relay processing section 44.

On the other hand, for example, in the case that two or more high-order relay frames have not been stored in the Ethernet controller 42, the driver 43 sets a new standby time Tw in the timer 45 and stands by until the driver 43 receives the notification from the timer 45.

Although the driver 43 is configured such that, in the case that two or more high-order relay frames have been stored in the Ethernet controller 42, the driver 43 acquires the high-order relay frames from the Ethernet controller 42, the configuration thereof is not limited to this configuration.

The driver 43 may also be configured such that, in the case that N1 or more high-order relay frames have been stored in the Ethernet controller 42, the driver 43 acquires the high-order relay frames from the Ethernet controller 42. N1 is herein an integer of 3 or more.

Furthermore, the processing section 41 is not limited to be configured so as to output high-order relay frames to the IP stack L3 relay processing section 44 according to the polling system.

[Event-Driven System]

The processing section 41, for example, performs adjustment processing as described later in the case that a predetermined number or more of Ethernet frames, i.e., high-order relay frames, to be subjected to relay processing have been stored.

In more detail, upon receiving high-order relay frames from the switch device 31, the Ethernet controller 42 in the processing section 41 outputs the received high-order relay frames to the driver 43.

Upon receiving the high-order relay frames from the Ethernet controller 42, the driver 43 temporarily stores the received high-order relay frames.

In the case that the number of the stored high-order relay frames becomes 2 or more, the driver 43 outputs the stored high-order relay frames to the IP stack L3 relay processing section 44.

Although the driver 43 is configured such that, in the case that the number of the stored high-order relay frames becomes two or more, the driver 43 outputs the stored high-order relay frames to the IP stack L3 relay processing section 44, the configuration thereof is not limited to this configuration.

The driver 43 may also be configured such that, in the case that the number of the stored high-order relay frames becomes N2 or more, the driver 43 outputs the stored high-order relay frames to the IP stack L3 relay processing section 44. N2 is herein an integer of 3 or more.

The processing section 41 relays data in the on-vehicle network via the switch section 31.

In detail, in the case that a plurality of Ethernet frames, i.e., a plurality of high-order relay frames, to be subjected to relay processing is present in the processing section 41, the processing section 41 performs adjustment processing to change the output rates of the respective high-order relay frames to the switch section 31 depending on whether the transmission source IP addresses of the respective high-order relay frames are the same.

In more detail, for example, in the case that the transmission source IP addresses of the respective high-order relay frames are different, the processing section 41 sets the output rates of the respective high-order relay frames to the same value. More specifically, for example, in the case that the transmission source addresses of the respective high-order relay frames are different instead of the same, the processing section 41 decreases the output rates in the adjustment processing.

More specifically, the IP stack L3 relay processing section 44 in the processing section 41 performs adjustment processing each time the IP stack L3 relay processing section 44 receives a plurality of high-order relay frames from the driver 43.

More specifically, for example, upon receiving the high-order relay frames A and B from the driver 43 in the congested state shown in FIG. 5, the IP stack L3 relay processing section 44 confirms that the transmission source IP address included in the received high-order relay frames A and the transmission source IP address included in the received high-order relay frames B are the IP address of the server and the IP address of the CGW 111B, respectively.

Upon confirming that the transmission source IP addresses included in the high-order relay frames A and B are different, the IP stack L3 relay processing section 44 performs L3 relay processing for the high-order relay frames A and B and outputs the high-order relay frames A and B to the driver 43 at a transmission speed of 1 Mbps.

For example, upon receiving the high-order relay frames A from the IP stack L3 relay processing section 44, the driver 43 outputs the received high-order relay frames A to the Ethernet controller 42.

Upon receiving the high-order relay frames A from the driver 43, the Ethernet controller 42 outputs the received high-order relay frames A to the switch section 31.

Upon receiving the high-order relay frames A from the Ethernet controller 42, the L2 switch processing section 32 in the switch section 31 transmits the received high-order relay frames A to the driving assist device 111D via the communication port 34D.

Like the high-order relay frames A, the high-order relay frames B are also transmitted from the IP stack L3 relay processing section 44 to the driving assist device 111D.

In this case, the transmission speeds of the high-order relay frames A and B to be transmitted from the switch device 101 are 1 Mbps as shown in FIG. 6.

However, the transmission speeds of the high-order relay frames A and B from the IP stack L3 relay processing section 44 to the driver 43 are not limited to 1 Mbps but may be other speeds.

Furthermore, although the IP stack L3 relay processing section 44 is configured so as to perform adjustment processing each time the IP stack L3 relay processing section 44 receives a plurality of high-order relay frames from the driver 43, the configuration thereof is not limited to this configuration. The IP stack L3 relay processing section 44 may also be configured so as to perform adjustment processing each time the IP stack L3 relay processing section 44 receives a plurality of high-order relay frames from the driver 43 two or more predetermined number of times. Moreover, the IP stack L3 relay processing section 44 may also be configured such that, after receiving a plurality of high-order relay frames from the driver 43 and performing adjustment processing, the IP stack L3 relay processing section 44 does not perform adjustment processing for a predetermined time and then, upon receiving a plurality of high-order relay frames from the driver 43 thereafter, the IP stack L3 relay processing section 44 performs adjustment processing again.

[Strict Priority Queuing]

Figure 11:
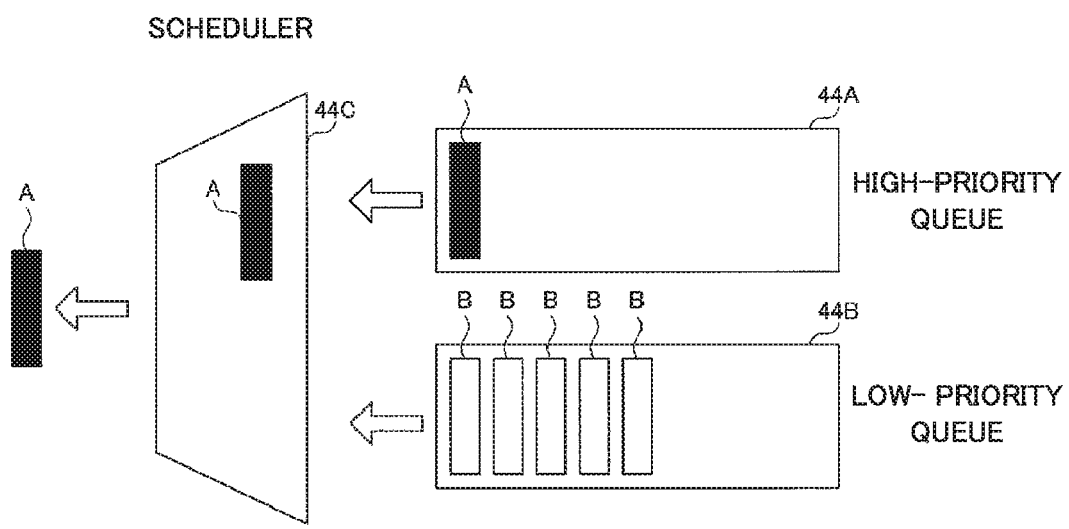
FIG. 11 is a view illustrating queue control performed by an IP stack L3 relay processing section in the switch device according to the first embodiment of the present disclosure.

FIG. 11 is a view illustrating queue control performed by the IP stack L3 relay processing section in the switch device according to the first embodiment of the present disclosure.

Referring to FIG. 11, for example, in the case that the transmission source IP addresses of the respective high-order relay frames are different, the processing section 41 outputs the respective high-order relay frames to the switch section 31 according to the priority of the respective transmission source IP addresses.

In more detail, the IP stack L3 relay processing section 44 includes, for example, a high-priority queue 44A, a low-priority queue 44B and a scheduler 44C. However, the IP stack L3 relay processing section 44 is not limited to be configured so as to include two queues, but may also be configured so as to include three or more queues.

According to the transmission source IP addresses included in the plurality of high-order relay frames having been subjected to the L3 relay processing, the IP stack L3 relay processing section 44 distributes the respective high-order relay frames to the high-priority queue 44A or the low-priority queue 44B.

In this example, since the priority level included in the high-order relay frames A has the highest value 7, the IP stack L3 relay processing section 44 distributes the high-order relay frames A to the high-priority queue 44A. Furthermore, since the priority level included in the high-order relay frames B has the second highest value 6, the IP stack L3 relay processing section 44 distributes the high-order relay frames B to the low-priority queue 44B.

Figure 12:
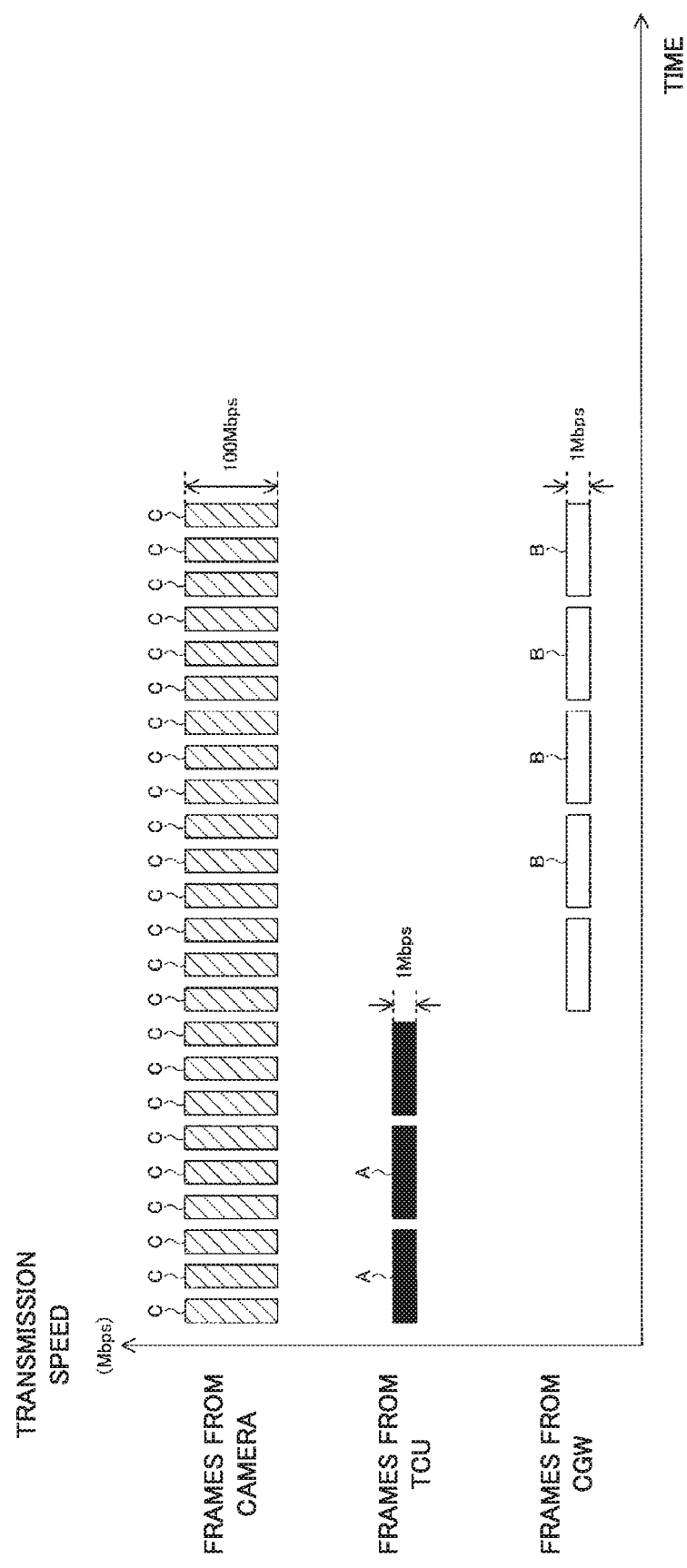
FIG. 12 is a view showing an example of a time chart indicating the time when the switch device according to the first embodiment of the present disclosure transmits the high-order relay frames and the low-order relay frames.

FIG. 12 is a view showing an example of a time chart indicating the time when the switch device according to the first embodiment of the present disclosure transmits the high-order relay frames and the low-order relay frames. In FIG. 12, the horizontal axis represents time and the vertical axis represents transmission speed.

Referring to FIGS. 11 and 12, in the case that the high-order relay frames A are included in the high-priority queue 44A, the scheduler 44C acquires the high-order relay frames A from the high-priority queue 44A and outputs the high-order relay frames A to the driver 4 at a transmission speed of 1 Mbps.

The scheduler 44C preferentially outputs the high-order relay frames A until the high-order relay frames A in the high-priority queue 44A are all output, and when the high-order relay frames A in the high-priority queue 44A are all output, the scheduler 44C acquires the high-order relay frames B from the low-priority queue 44B and outputs the high-order relay frames B to the driver 43 at a transmission speed of 1 Mbps.

In this example, as shown in FIG. 12, after three high-order relay frames A are transmitted continuously from the switch device 101 at a transmission speed of 1 Mbps, five high-order relay frames B are transmitted continuously from the switch device 101 at a transmission speed of 1 Mbps.

However, the scheduler 44C is not limited to be configured so as to output both the high-order relay frames A and B to the driver 43 at 1 Mbps, but may also be configured so as to output the high-order relay frames A and B at different transmission speeds.

Figure 13:
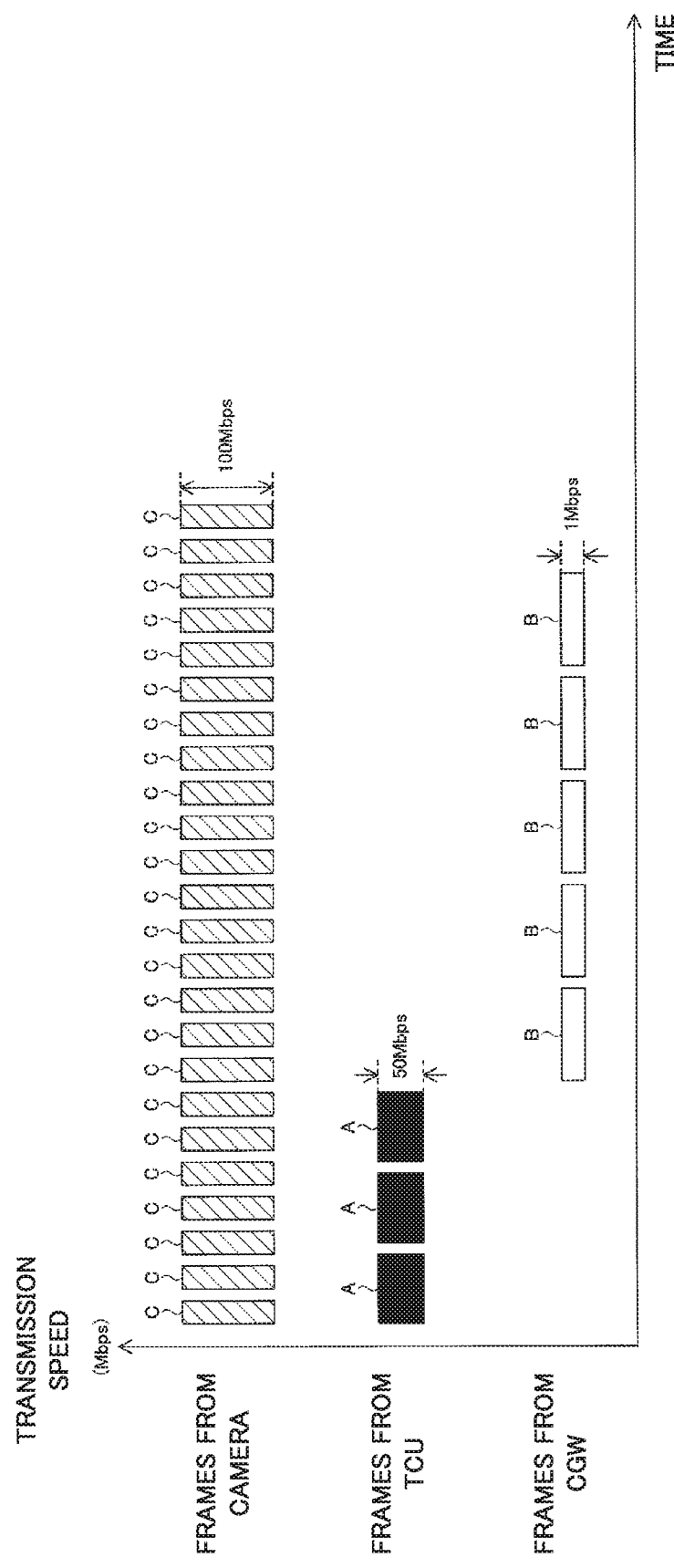
FIG. 13 is a view showing an example of a time chart indicating the time when the switch device according to the first embodiment of the present disclosure transmits the high-order relay frames and the low-order relay frames.

FIG. 13 is a view showing an example of a time chart indicating the time when the switch device according to the first embodiment of the present disclosure transmits the high-order relay frames and the low-order relay frames. In FIG. 13, the horizontal axis represents time and the vertical axis represents transmission speed.

Referring to FIGS. 11 and 13, the processing section 41, for example, sets the output rates of the respective high-order relay frames in the case that the transmission source IP addresses of the respective high-order relay frames are different to different values for all the transmission source IP addresses.

In this example, the scheduler 44C in the IP stack L3 relay processing section 44, for example, outputs the high-order relay frames A included in the high-priority queue 44A to the driver 43 at a transmission speed of 50 Mbps and outputs the high-order relay frames B included in the low-priority queue 44B to the driver 43 at a transmission speed of 1 Mbps.

In this case, as shown in FIG. 13, after three high-order relay frames A are transmitted continuously from the switch device 101 at a transmission speed of 50 Mbps, five high-order relay frames B are transmitted continuously from the switch device 101 at a transmission speed of 1 Mbps.

[Weighted Round Robin]

Figure 14:
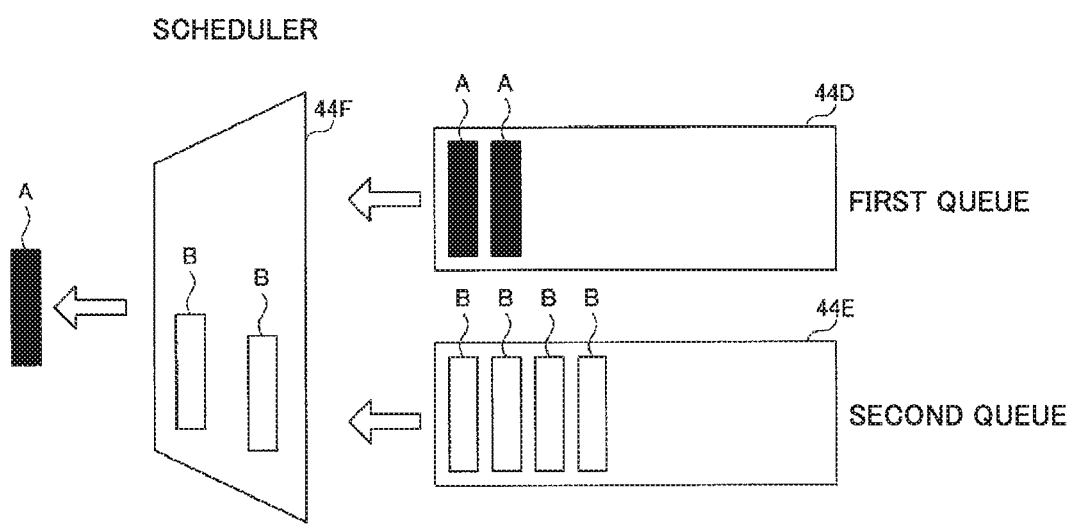
FIG. 14 is a view illustrating queue control performed by the IP stack L3 relay processing section in the switch device according to the first embodiment of the present disclosure.

FIG. 14 is a view illustrating queue control performed by the IP stack L3 relay processing section in the switch device according to the first embodiment of the present disclosure.

Referring to FIG. 14, the IP stack L3 relay processing section 44, for example, includes a first queue 44D, a second queue 44E and a scheduler 44F.

According to the transmission source IP addresses included in the plurality of high-order relay frames having been subjected to the L3 relay processing, the IP stack L3 relay processing section 44 distributes the respective high-order relay frames to the first queue 44D or the second queue 44E.

In this example, the IP stack L3 relay processing section 44 distributes the high-order relay frames A and B to the first queue 44D and the second queue 44E, respectively.

Figure 15:
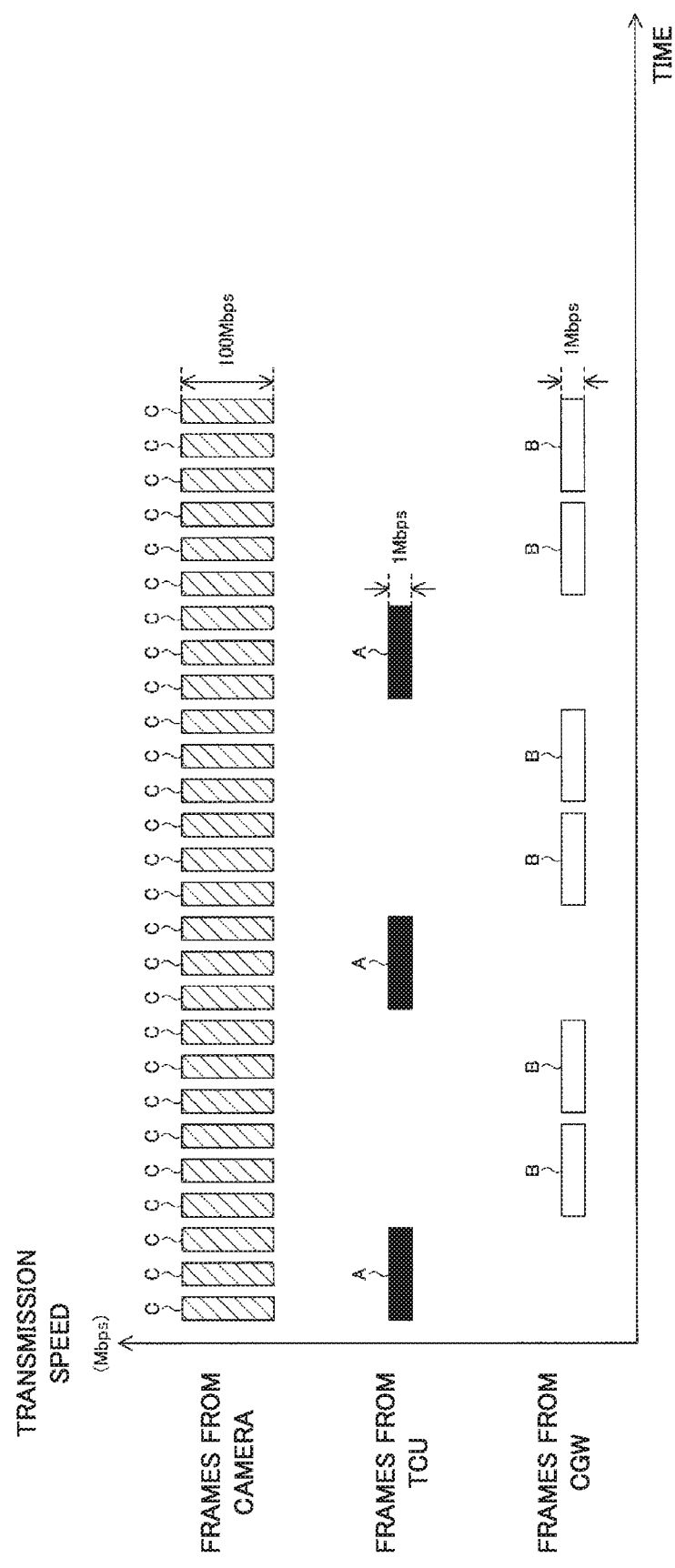
FIG. 15 is a view showing an example of a time chart indicating the time when the switch device according to the first embodiment of the present disclosure transmits the high-order relay frames and the low-order relay frames.

FIG. 15 is a view showing an example of a time chart indicating the time when the switch device according to the first embodiment of the present disclosure transmits the high-order relay frames and the low-order relay frames. In FIG. 15, the horizontal axis represents time and the vertical axis represents transmission speed.

Referring to FIGS. 14 and 15, according to the weighting ratio between the first queue 44D and the second queue 44E, the scheduler 44F acquires the high-order relay frames from the first queue 44D and the second queue 44E.

In this example, a situation is assumed in which a 1:2 weighting ratio is set between the first queue 44D and the second queue 44E.

The scheduler 44F, for example, acquires one high-order relay frame A from the first queue 44D and outputs the high-order relay frame A to the driver 43 at a transmission speed of 1 Mbps and then acquires two high-order relay frame B continuously from the second queue 44E and outputs the high-order relay frames B to the driver 43 at a transmission speed of 1 Mbps; the scheduler 44F repeats this operation.

In this example, as shown in FIG. 15, after one high-order relay frame A is transmitted from the switch device 101 at a transmission speed of 1 Mbps, two high-order relay frames B are transmitted continuously from the switch device 101 at a transmission speed of 1 Mbps; this transmission is repeated. In this case, the transmission speed of the high-order relay frames B can be made substantially twice as high as the transmission speed of the high-order relay frames A.

With this configuration in which the weighting ratio between the first queue 44D and the second queue 44E is set as described above, the substantial transmission speeds of the high-order relay frames A and B can be adjusted depending on the preset weighting ratio.

However, the scheduler 44F is not limited to be configured so as to output both the high-order relay frames A and B to the driver 43 at 1 Mbps, but may also be configured so as to output them at different transmission speeds.

Figure 16:
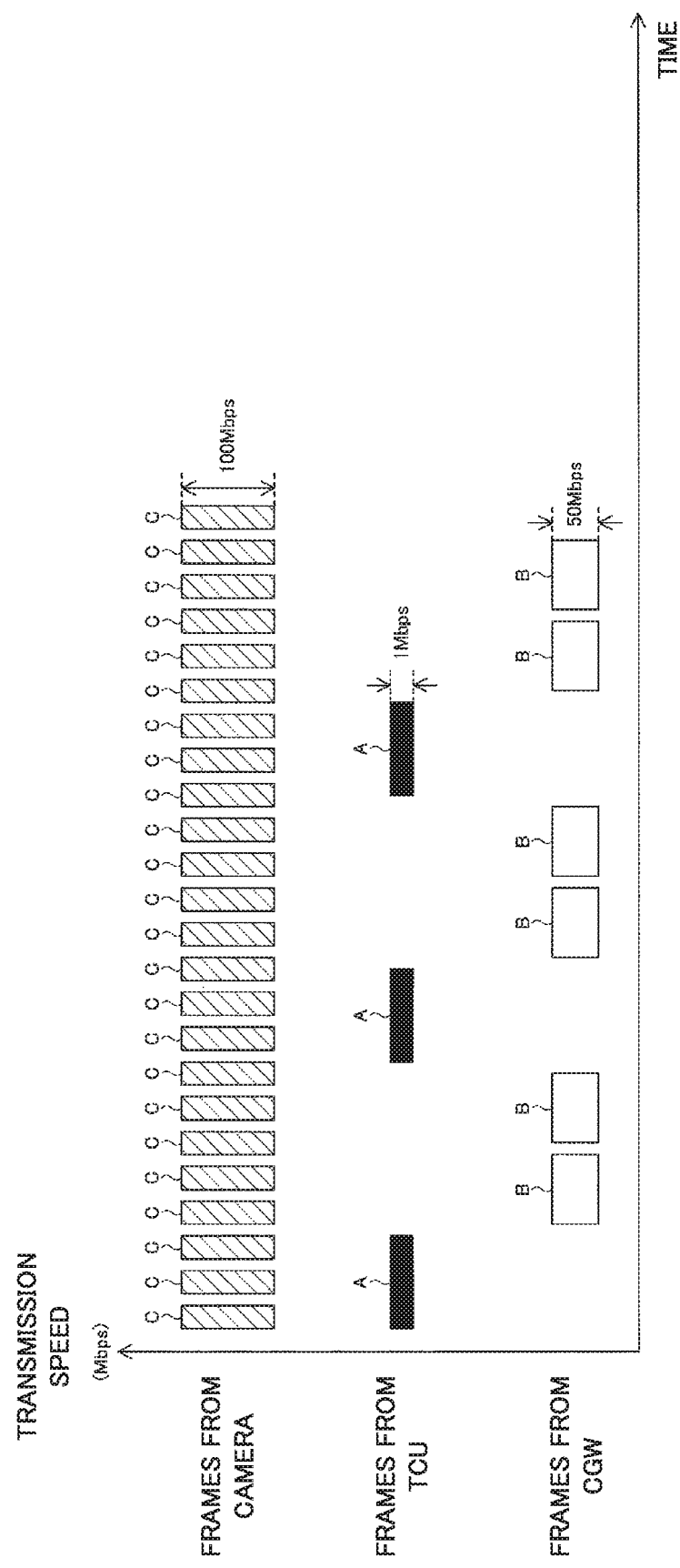
FIG. 16 is a view showing an example of a time chart indicating the time when the switch device according to the first embodiment of the present disclosure transmits the high-order relay frames and the low-order relay frames.

FIG. 16 is a view showing an example of a time chart indicating the time when the switch device according to the first embodiment of the present disclosure transmits the high-order relay frames and the low-order relay frames. In FIG. 16, the horizontal axis represents time and the vertical axis represents transmission speed.

Referring to FIGS. 14 and 16, in this example, the scheduler 44F in the IP stack L3 relay processing section 44, for example, acquires one high-order relay frame A from the first queue 44D and outputs the high-order relay frame A to the driver 43 at a transmission speed of 1 Mbps and then acquires two high-order relay frame B continuously from the second queue 44E and outputs the high-order relay frames B to the driver 43 at a transmission speed of 50 Mbps; the scheduler 44F repeats this operation.

In this example, as shown in FIG. 16, after one high-order relay frame A is transmitted from the switch device 101 at a transmission speed of 1 Mbps, two high-order relay frames B are transmitted continuously from the switch device 101 at a transmission speed of 50 Mbps; this transmission is repeated. In this case, the transmission speed of the high-order relay frames B can be made substantially 100 times as high as the transmission speed of the high-order relay frames A.

Figure 17:
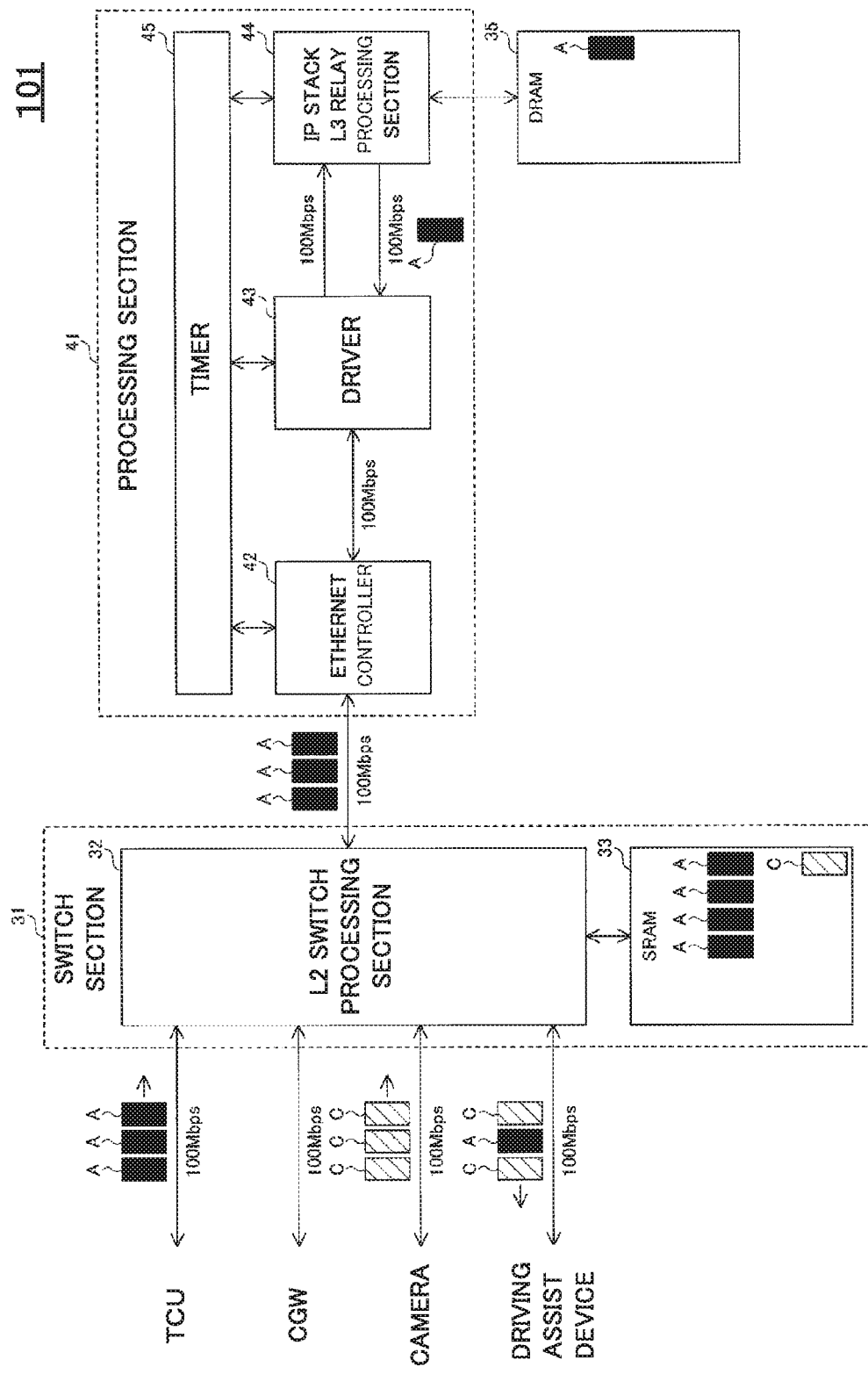
FIG. 17 is a view showing a detailed configuration of the switch device according to the first embodiment of the present disclosure.

FIG. 17 is a view showing a detailed configuration of the switch device according to the first embodiment of the present disclosure. FIG. 17 shows a state in which the high-order relay frames A and B are not congested in the switch device 101. The way in which the configuration is viewed in FIG. 17 is similar to the way in which the configuration is viewed in FIG. 10.

Figure 18:
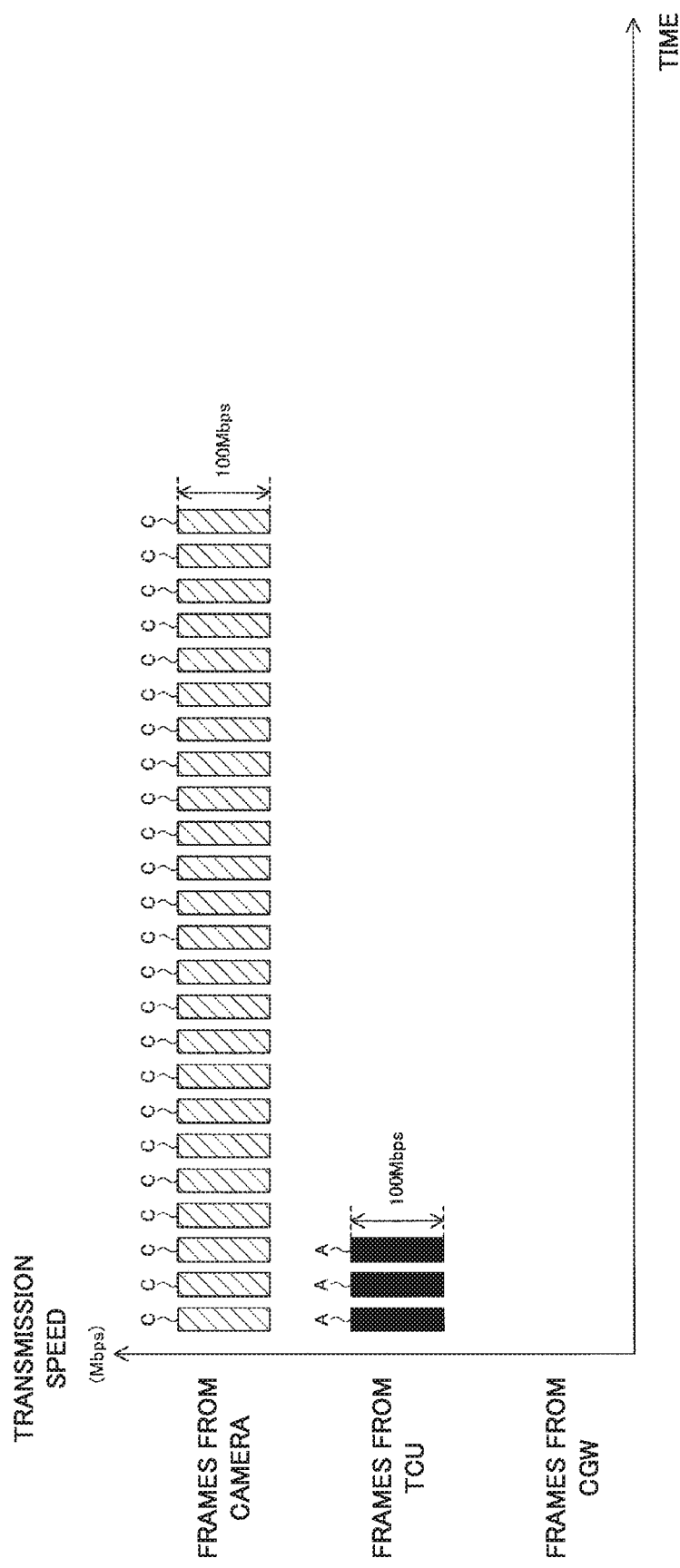
FIG. 18 is a view showing an example of a time chart indicating the time when the switch device according to the first embodiment of the present disclosure transmits the high-order relay frames and the low-order relay frames.

FIG. 18 is a view showing an example of a time chart indicating the time when the switch device according to the first embodiment of the present disclosure transmits the high-order relay frames and the low-order relay frames. In FIG. 18, the horizontal axis represents time and the vertical axis represents transmission speed.

Referring to FIGS. 17 and 18, in this example, in the switch device 101, as in the case shown in FIG. 8, the L2 switch processing section 32 receives the high-order relay frames A but does not receive the high-order relay frames B, whereby the switch device 101 is in a state in which the high-order relay frames are not congested.

For example, upon receiving two high-order relay frames A from the driver 43, the IP stack L3 relay processing section 44 confirms that the received two transmission source IP addresses are the IP address of the server.

Upon confirming that the transmission source IP addresses included in the two high-order relay frames A having received from the driver 43 are the same, the IP stack L3 relay processing section 44 performs L3 relay processing for the two high-order relay frames A and outputs the two high-order relay frames A to the driver 43 at a transmission speed of 100 Mbps.

In this case, the transmission speeds of the high-order relay frames A to be transmitted from the switch device 101 are 100 Mbps as shown in FIG. 18.

With this configuration in which the output rate of the high-order relay frames to the switch section 31 in the state in which the high-order relay frames are not congested is made larger than the output rates of the high-order relay frames to the switch section 31 in the state in which the high-order relay frames are congested, the transmission speed of the high-order relay frames from the switch device 101 can be raised in a situation in which there is a high possibility capable of performing relay processing without causing frame loss as in the state in which the high-order relay frames are not congested. Hence, the transmission speed of the high-order relay frames can be improved while enhancing the possibility of making relay processing successful without causing frame loss.

[Flow of Operation]

The switch device 101 is equipped with a computer, and an arithmetic processing section, such as a CPU, in the computer reads a program including some or all of the respective steps of the flow chart described below and executes the program. The program for this device can be installed externally. The program for this device is distributed in a state of being stored on a recording medium.

Figure 19:
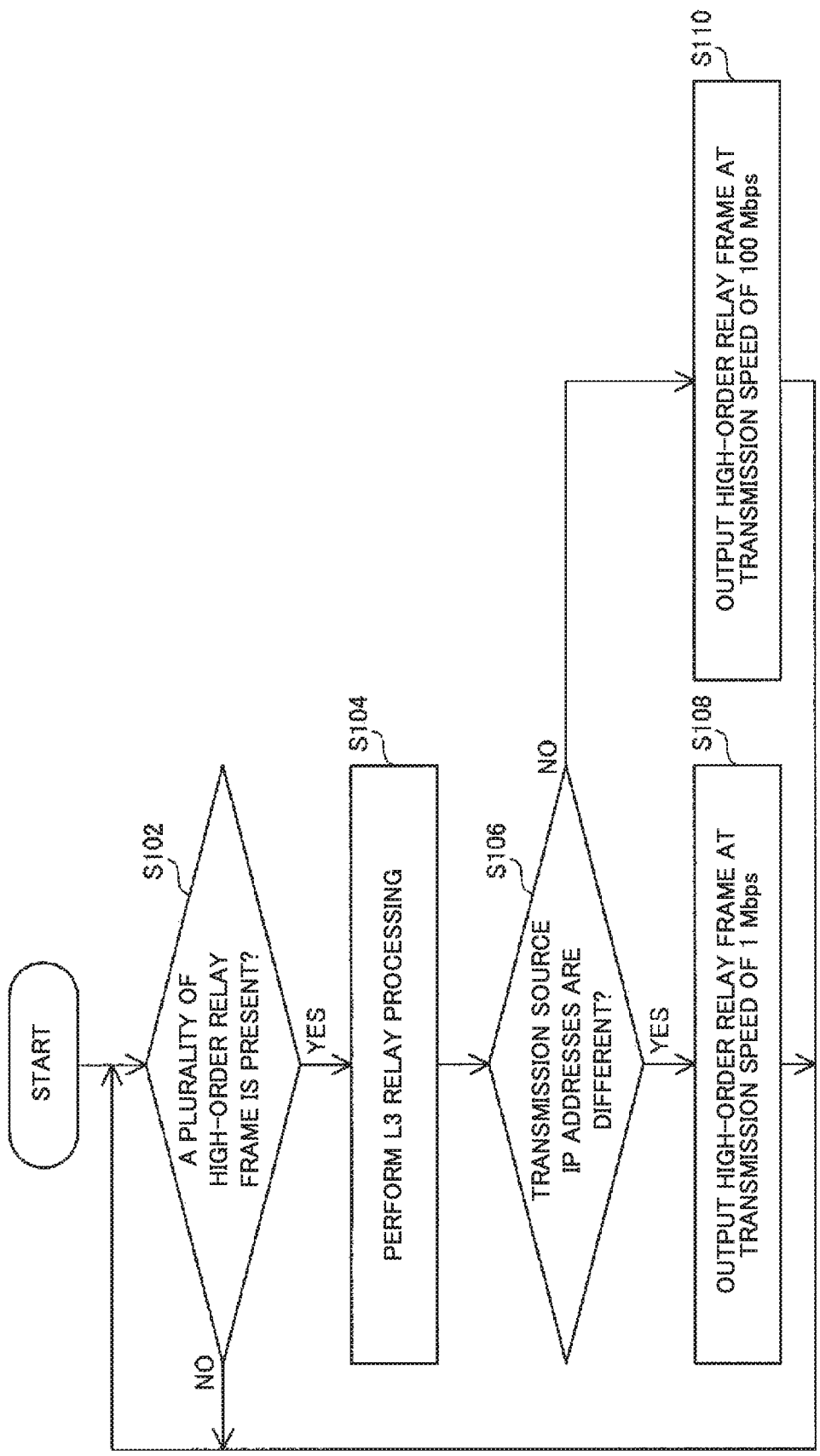
FIG. 19 is a flow chart specifying an operation procedure to be followed when the switch device according to the first embodiment of the present disclosure relays the high-order relay frames.

FIG. 19 is a flow chart specifying an operation procedure to be followed when the switch device according to the first embodiment of the present disclosure relays the high-order relay frames.

Referring to FIG. 19, first, the processing section 41 in the switch device 101 stands by until the processing section 41 confirms that a plurality of high-order relay frames is present by using the polling system or the event-driven system (NO at step S102).

And then, upon confirming that a plurality of high-order relay frames is present (YES at step S102), the processing section 41 performs L3 relay processing for the received plurality of high-order relay frames (at step S104).

Next, in the case that the transmission source IP addresses included in the plurality of high-order relay frames having been subjected to the L3 relay processing are different (YES at step S106), the processing section 41 outputs the plurality of high-order relay frames to the switch section 31 at a transmission speed of 1 Mbps (at step S108).

On the other hand, in the case that all the transmission source IP addresses included in the plurality of high-order relay frames having been subjected to the L3 relay processing are the same (NO at step S106), the processing section 41 outputs the plurality of high-order relay frames to the switch section 31 at a transmission speed of 100 Mbps (at step S110).

Next, after outputting the above-mentioned plurality of high-order relay frames to the switch section 31 at a transmission speed of 1 Mbps (at step S108) or after outputting the above-mentioned plurality of high-order relay frames to the switch section 31 at a transmission speed of 100 Mbps (at step S110), the processing section 41 stands by until the processing section 41 confirms that a plurality of high-order relay frames is present by using the polling system or the event-driven system (NO at step S102).

At the above-mentioned step S108, the processing section 41 may control the output order of the plurality of high-order relay frames having been subjected to the L3 relay processing to the switch section 31 according to the transmission source IP addresses by Strict Priority Queuing or Weighted Round Robin.

Furthermore, in the switch device according to the first embodiment of the present disclosure, although the processing section 41 is configured so as to perform adjustment processing depending on whether the transmission source IP addresses of the respective high-order relay frames are the same or not, the configuration thereof is not limited to this configuration. The processing section 41 may also be configured so as to perform adjustment processing depending on whether the transmission source MAC addresses of the respective high-order relay frames are the same or not.

Moreover, in the switch device according to the first embodiment of the present disclosure, although the processing section 41 is configured so as to perform L3 relay processing for the high-order relay frames A and B having different transmission source addresses, the configuration thereof is not limited to this configuration. The processing section 41 may also be configured so as to perform L3 relay processing for three or more kinds of the high-order relay frames having different transmission source addresses. In this case, for example, in the case that three or more high-order relay frames to be subjected to L3 relay processing are present in the processing section 41, the processing section 41 may also be configured so as to set the output rates to 1 Mbps in the case that some of the transmission source addresses included in the respective high-order relay frames are different, or the processing section 41 may also be configured so as to set the output rates to 1 Mbps in the case that all the transmission source addresses included in the respective high-order relay frames are different. At this time, in the case that all the transmission source addresses included in the respective high-order relay frames are the same, the processing section 41 sets the output rates to, for example, 100 Mbps.

What's more, in the switch device according to the first embodiment of the present disclosure, although the IP stack L3 relay processing section 44 in the processing section 41 is configured so as to output the high-order relay frames to the driver 43 by using the scheduler 44C and the scheduler 44F, the configuration thereof is not limited to this configuration. The IP stack L3 relay processing section 44 may also be configured so as to output the high-order relay frames to the driver 43 without using the scheduler 44C and the scheduler 44F. In this case, the IP stack L3 relay processing section 44, for example, outputs the high-order relay frames having been subjected to the L3 relay processing to the driver 43 in the order that they are received from the driver 43.

Still further, in the switch device according to the first embodiment of the present disclosure, although the processing section 41 is configured so as to set the output rates of the high-order relay frames A and B in the case that the transmission source IP addresses of the high-order relay frames A and B are different to different values in all the respective transmission source IP addresses, the configuration thereof is not limited to this configuration. For example, in the case that the transmission source IP addresses of the high-order relay frames are available in three kinds, the processing section 41 may also be configured so as to set the output rates of the three kinds of the high-order relay frames to values that are different in some of the respective transmission source IP addresses. More specifically, the processing section 41 sets the output rates of the three kinds of the high-order relay frames to, for example, 1 Mbps, 1 Mbps and 20 Mbps, respectively.

Yet still further, in the switch device according to the first embodiment of the present disclosure, although the Ethernet controller 42 and the driver 43 in the processing section 41 are configured so as to confirm whether a plurality of high-order relay frames is present by using the polling system or the event-driven method, the configuration thereof is not limited to this configuration. Like the Ethernet controller 92 and the driver 93 shown in FIG. 4, the processing section 41 may also be configured so that, each time the processing section 41 receives the high-order relay frame from the L2 switch processing section 32 on the low-order side, the processing section 41 outputs the high-order relay frame to the IP stack L3 relay processing section 94 on the high-order side. In this case, the IP stack L3 relay processing section 94 judges whether a plurality of high-order relay frames to be relayed is present.

The on-vehicle network described in Patent Document 1 is provided with the communication gateway for relaying information transmitted from the on-vehicle communication devices.

For example, as a configuration of the communication gateway, a configuration equipped with an L2 switch for performing layer 2 relay processing and an MCU for performing layer 3 relay processing is conceivable.

In this configuration, for example, in the case that the communication gateway has received data, the L2 switch relays data that can be relayed at the L2 level and outputs data that is required to be processed at the L3 level to the MCU. Upon receiving the data from the L2 switch, the MCU relays the received data and transmits the data to a relay destination device via the L2 switch. In this relay processing, the data is serially processed.

For example, in a congested state in which the communication gateway receives data from a plurality of communication paths in parallel, part of the received data is required to be put on standby. Hence, the received data is temporarily stored, for example, in the RAM for the L2 switch.

However, in the case that the remaining capacity of the RAM is scarce, data loss may sometimes occur. Although it is conceivable to use a configuration in which the output rate of the data from the MCU to the L2 switch is lowered in order to solve this problem, since the output rate of the data from the MCU to the L2 switch is low in this case, relay processing takes time even in a non-congested state in which the remaining capacity of the RAM is sufficient.

On the other hand, the switch device according to the first embodiment of the present disclosure relays the data in the on-vehicle network. The processing section 41 performs relay processing via the switch section 31. After that, in the case that a plurality of Ethernet frames to be subjected to the relay processing is present in the processing section 41, the processing section 41 performs adjustment processing so that the output rates of the respective Ethernet frames to the switch section 31 in the case that the transmission source IP addresses of the respective Ethernet frames are different are made smaller than the output rates in the case that the transmission source IP addresses of the respective Ethernet frames are the same.

With this configuration, the processing section 41 can judge whether the switch device 101 incorporating the processing section 41 is in a congested state on the basis of whether the transmission source IP addresses of the respective Ethernet frames are the same. And then, in the case that the transmission source IP addresses of the respective frames are different, the processing section 41 judges that the switch device 101 is in a congested state in which there is a high possibility that the remaining capacity of the SRAM 33 will become scarce and then lowers the output rates, thereby being capable of preventing data loss. Furthermore, in the case that the transmission source IP addresses of the respective frames are the same, the processing section 41 judges that the switch device 101 is in a non-congested state in which the possibility of causing data loss is low and then raises the output rates, thereby being capable of completing the relay processing via the processing section 41 more quickly. Consequently, in the on-vehicle network, the relay processing of the data can be performed efficiently while preventing data loss.

Furthermore, in the switch device according to the first embodiment of the present disclosure, the processing section 41 sets the output rates of the respective Ethernet frames in the case that the transmission source IP addresses of the respective Ethernet frames are different to the same value.

With this configuration, in a congested state, data can be relayed at the same speed to the devices having the respective transmission source IP addresses. Furthermore, since the output rate is not required to be changed for each Ethernet frame, the adjustment processing can be simplified.

Moreover, in the switch device according to the first embodiment of the present disclosure, in the case that the transmission source IP addresses of the respective Ethernet frames are different, the processing section 41 outputs the respective Ethernet frames to the switch section 31 according to the priority of the respective transmission source IP addresses.

With this configuration, for example, in a congested state in which the output rates are lowered, since Ethernet frames to be relayed preferentially can be output to the switch section 31 more quickly, the transmission delay of important data in the on-vehicle network can be further decreased.

What's more, in the switch device according to the first embodiment of the present disclosure, the processing section 41 sets the output rates of the respective Ethernet frames in the case that the transmission source IP addresses of the respective Ethernet frames are different to different values at all or some of the respective transmission source IP addresses.

With this configuration, in a congested state, since the Ethernet frames can be output to the switch section 31 at the output rates according to the transmission source IP addresses, the Ethernet frames can be transmitted according to flexible speed setting.

Still further, in the switch device according to the first embodiment of the present disclosure, the processing section 41 periodically confirms whether a plurality of Ethernet frames to be subjected to the relay processing is present.

With this configuration, it is possible to confirm the presence of the plurality of Ethernet frames to be subjected to the relay processing by using a simple polling system in which the confirmation is performed periodically.

Yet still further, in the switch device according to the first embodiment of the present disclosure, the processing section 41 performs the adjustment processing in the case that a predetermined number or more of Ethernet frames to be subjected to the relay processing have been stored.

With this configuration, the adjustment processing can be performed by performing event-driven type processing in which the fact that a predetermined number or more of Ethernet frames to be subjected to the relay processing have been stored is used as a trigger.

Next, another embodiment according to the present disclosure will be described referring to drawings. The same or equivalent components are designated by the same numerals and signs, and their descriptions are not repeated.

SECOND EMBODIMENT

This embodiment relates to a switch device wherein the processing section thereof controls the transmission of high-order relay frames in the on-vehicle network, in comparison with the switch device according to the first embodiment. The switch device is similar to the switch device according to the first embodiment except for the contents described below.

[Configuration of a Switch Device 102]

Figure 20:
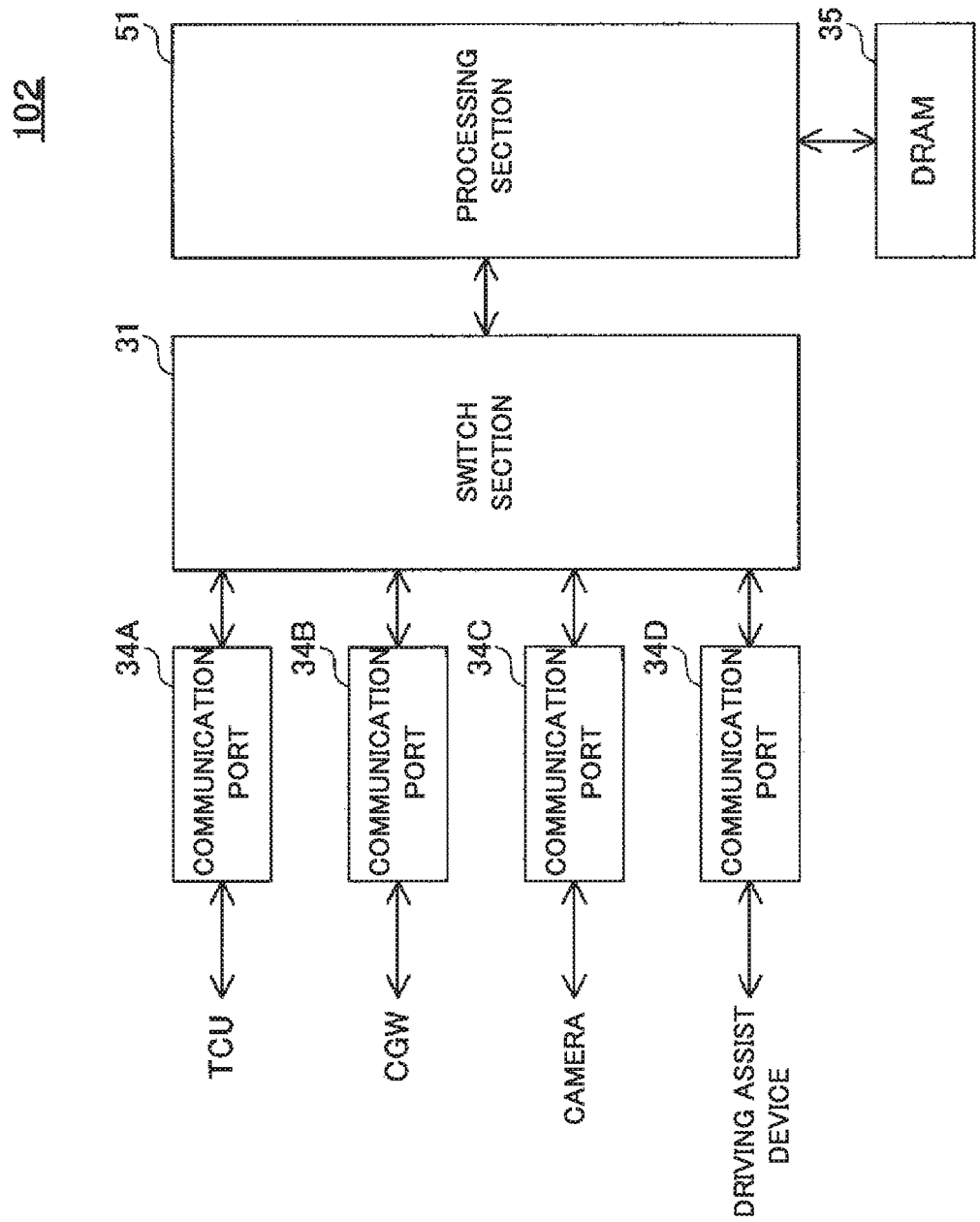
FIG. 20 is a view showing a configuration of a switch device in an on-vehicle communication system according to a second embodiment of the present disclosure.

FIG. 20 is a view showing a configuration of a switch device in an on-vehicle communication system according to a second embodiment of the present disclosure.

Referring to FIG. 20, a switch device 102 is equipped with the switch section 31, the communication ports 34A, 34B, 34C and 34D, the DRAM (Dynamic RAM) 35 and a processing section 51.

The operations of the switch section 31, the communication ports 34A, 34B, 34C and 34D and the DRAM 35 in the switch device 102 are similar to those of the switch section 31, the communication ports 34A, 34B, 34C and 34D and the DRAM 35 in the switch device 101 shown in FIG. 3, respectively.

Figure 21:
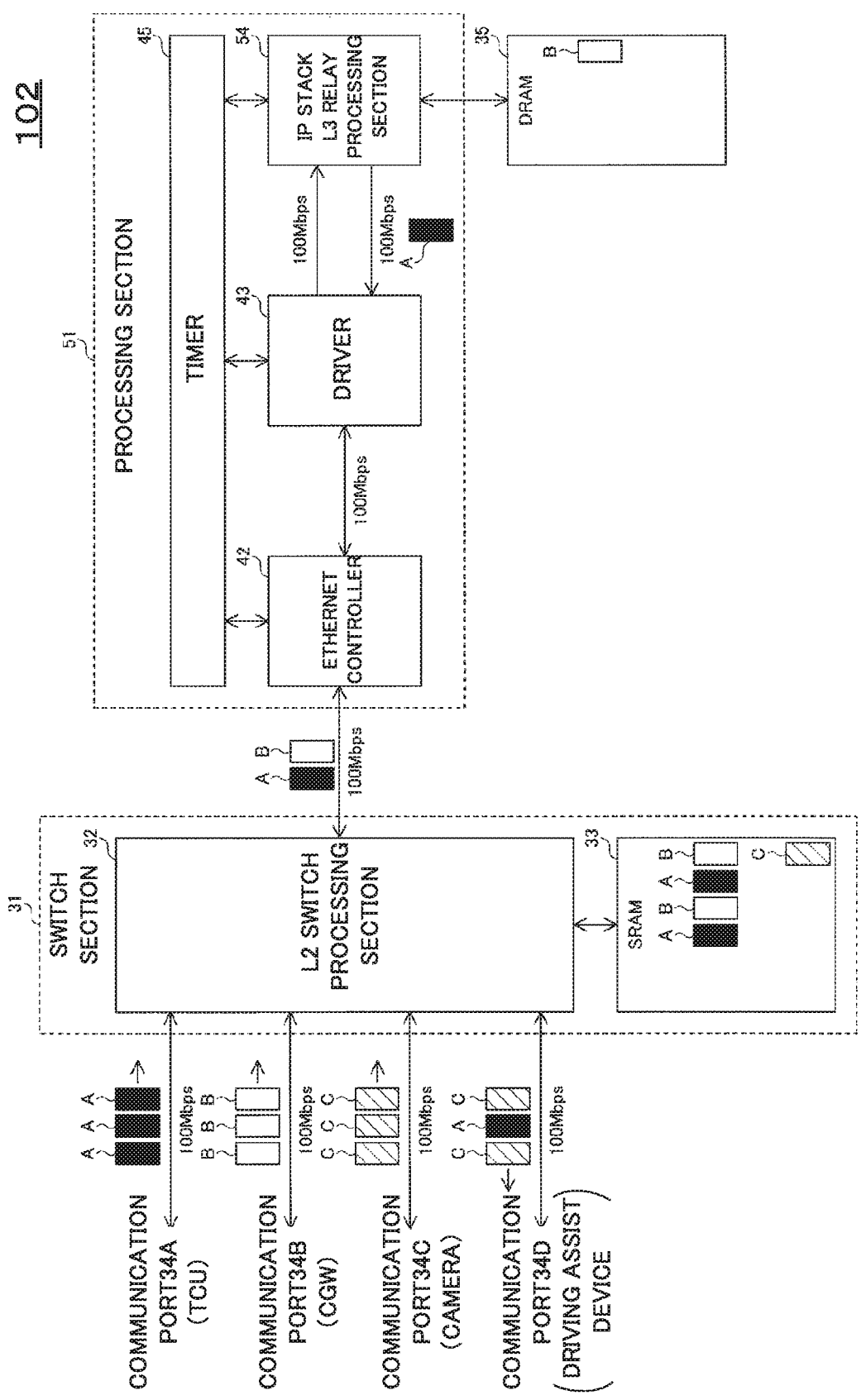
FIG. 21 is a view showing a detailed configuration of the switch device according to the second embodiment of the present disclosure.

FIG. 21 is a view showing a detailed configuration of the switch device according to the second embodiment of the present disclosure. FIG. 21 shows a state in which the high-order relay frames A and B are congested in the switch device 102.

Referring to FIG. 21, the switch section 31 in the switch device 102 includes the L2 switch processing section 32 and the SRAM 33. The processing section 51 includes the Ethernet controller 42, the driver 43, the timer 45 and an IP stack L3 relay processing section 54.

The operations of the L2 switch processing section 32, the SRAM 33, the Ethernet controller 42, the driver 43 and the timer 45 in the switch device 102 are similar to those of the L2 switch processing section 32, the SRAM 33, the Ethernet controller 42, the a driver 43 and the timer 45 in the switch device 101 shown in FIG. 10.

The high-order relay frames are transmitted at a transmission speed of 100 Mbps between the L2 switch processing section 32 and the Ethernet controller 42, between the Ethernet controller 42 and the driver 43, and between the driver 43 and the IP stack L3 relay processing section 54.

The processing section relays data in the on-vehicle network via the switch section 31.

In detail, in the case that a plurality of Ethernet frames, i.e., high-order relay frames, to be subjected to the relay processing is present in the processing section 51 and when the transmission source IP addresses of the respective high-order relay frames are different, the processing section 51 performs adjustment processing for transmitting an instruction regarding the transmission timing of the high-order relay frames to at least either one of the devices having the respective transmission source IP addresses.

Figure 22:
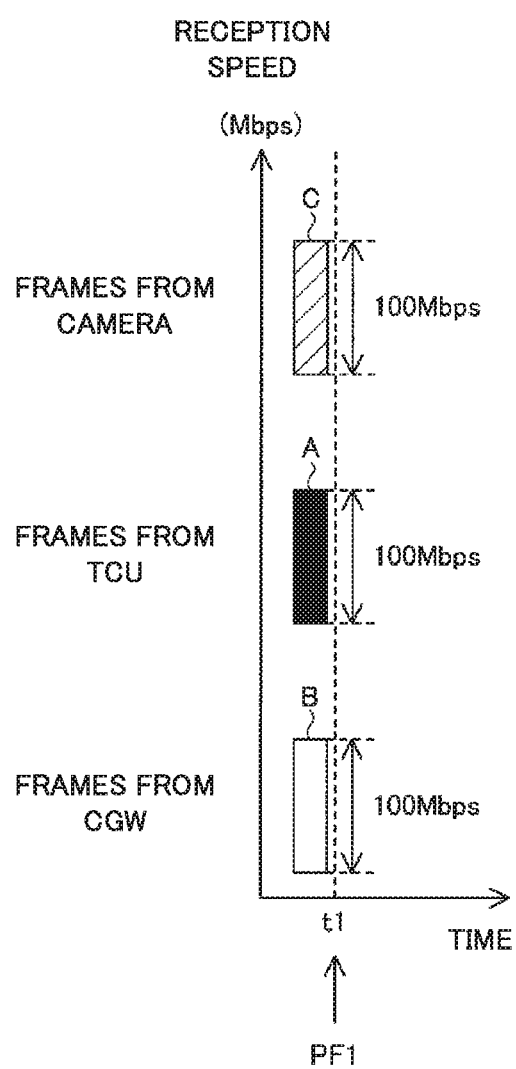
FIG. 22 is a view showing an example of a time chart indicating the time when the switch device in the on-vehicle communication system according to the second embodiment of the present disclosure receives the high-order relay frames and the low-order relay frames.

FIG. 22 is a view showing an example of a time chart indicating the time when the switch device in the on-vehicle communication system according to the second embodiment of the present disclosure receives the high-order relay frames and the low-order relay frames. In FIG. 22, the horizontal axis represents time and the vertical axis represents reception speed.

Referring to FIG. 22, in this example, the switch device 102 is in a congested state in which the L2 switch processing section 32 receives the high-order relay frames A, the high-order relay frames B and the low-order relay frames C in parallel from the communication ports 34A, 34B and 34C, respectively, at a reception speed of 100 Mbps.

Referring to FIGS. 21 and 22, for example, upon receiving the high-order relay frames A and B from the driver 43 in the congested state shown in FIG. 22, the IP stack L3 relay processing section 54 in the processing section 51 confirms that the transmission source IP addresses included in the received high-order relay frames A and the transmission source IP addresses included in the received high-order relay frames B are the IP address of the server and the IP address of the CGW 111B, respectively.

Upon confirming that the transmission source IP addresses included in the high-order relay frames A and B are different, the IP stack L3 relay processing section 54 recognizes that the high-order relay frames are congested.

Furthermore, the IP stack L3 relay processing section 54 confirms that the priority levels included in the high-order relay frames A and B are 7 and 6, respectively, thereby recognizing that the high-order relay frames A should be relayed more preferentially than the high-order relay frames B.

Figure 23:
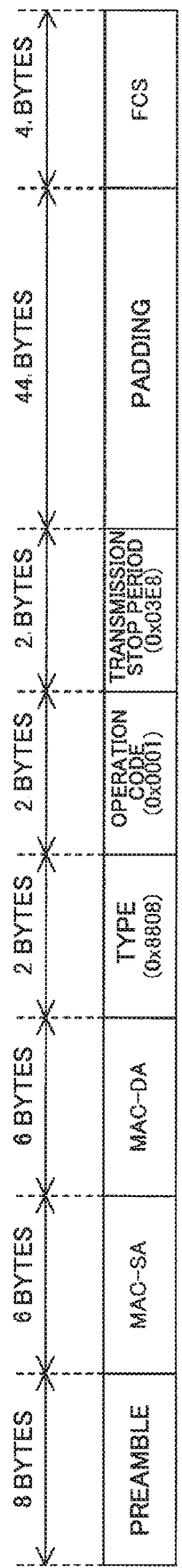
FIG. 23 is a view showing an example of a pause frame to be transmitted in the on-vehicle network according to the second embodiment of the present disclosure.

FIG. 23 is a view showing an example of a pause frame to be transmitted in the on-vehicle network according to the second embodiment of the present disclosure.

The pause frame has respective fields for storing a preamble, a transmission source MAC address (MAC-SA), a transmission destination MAC address (MAC-DA), a type, an operation code, a transmission stop period, padding and an FCS (Frame Check Sequence) in this order from the head.

The sizes of the respective fields are 8 bytes, 6 bytes, 6 bytes, 2 bytes, 2 bytes, 2 bytes, 44 bytes and 4 bytes in this order from the head.

In the pause frame, values 0x8808 and 0x0001 are stored as the type and the operation code, respectively. The numeral beginning with "0x" herein means that the numeral after "0x" is represented in hexadecimal notation.

Moreover, the length of a pause period can be set depending on the value specified in the transmission stop period. In this example, since 0x03E8 represented in hexadecimal notation corresponds to 1000 in decimal notation, 5.12 msec that is calculated by 1000×512/(100×10^6) is set as the length of the pause period. [a^b] herein means the b-th power of a.

Figure 24:
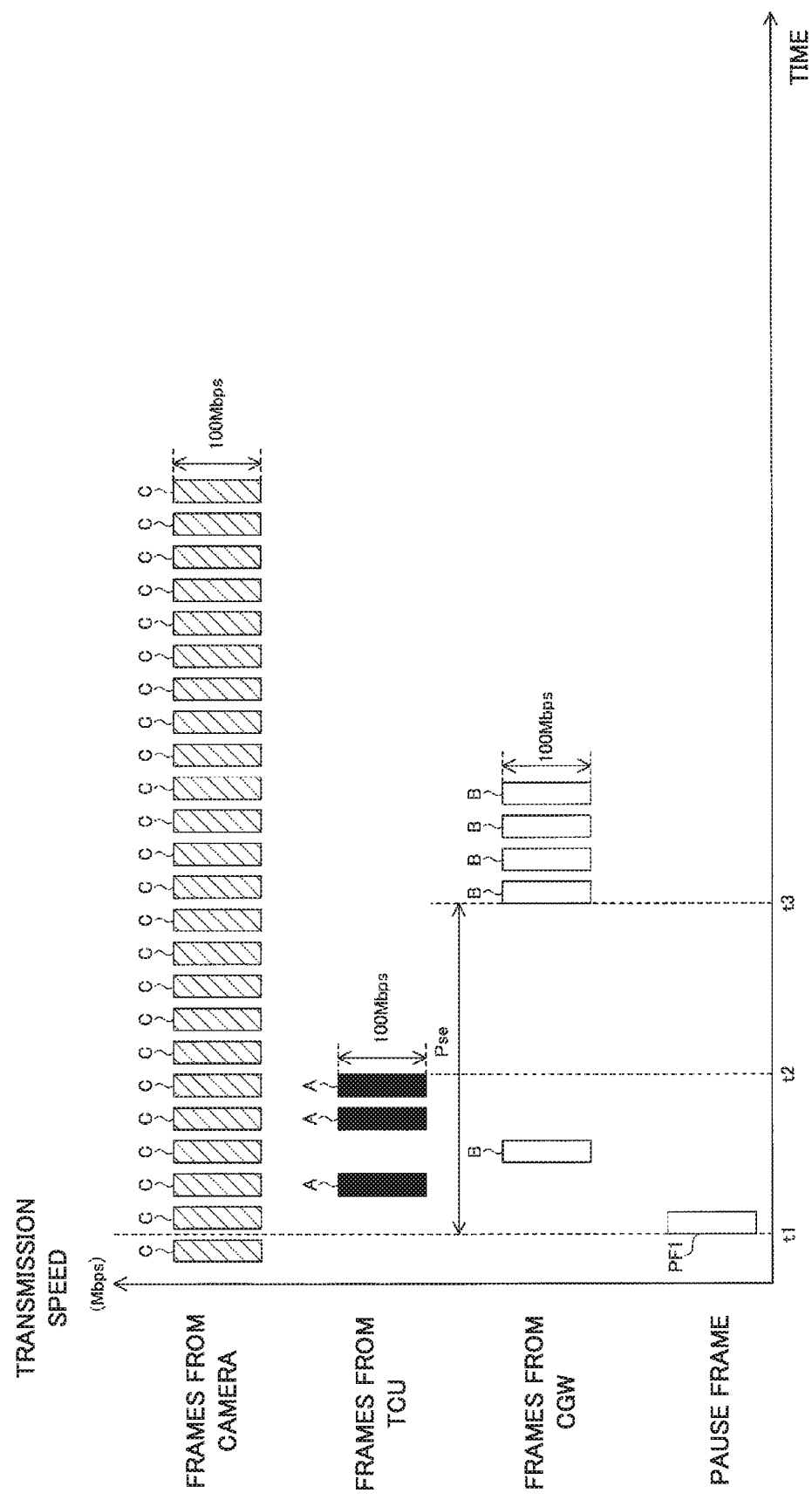
FIG. 24 is a view showing an example of a time chart indicating the time when the switch device according to the second embodiment of the present disclosure transmits the high-order relay frames and the low-order relay frames.

FIG. 24 is a view showing an example of a time chart indicating the time when the switch device according to the second embodiment of the present disclosure transmits the high-order relay frames and the low-order relay frames. In FIG. 24, the horizontal axis represents time and the vertical axis represents transmission speed.

Referring to FIGS. 21 and 24 again, the IP stack L3 relay processing section 54 creates a pause frame PF1 including the MAC address of the switch device 102 incorporating the IP stack L3 relay processing section 54, the MAC address of the CGW 111B and 0x03E8 as MAC-SA, MAC-DA and the transmission stop period, respectively.

The IP stack L3 relay processing section 54 outputs the created pause frame PF1 at time t1 to the switch section 31 via the driver 43 and the Ethernet controller 42.

Upon receiving the pause frame PF1 from the processing section 51, the L2 switch processing section 32 in the switch section 31 transmits the received pause frame PF1 to the CGW 111B via the communication port 34B.

What's more, after outputting the pause frame PF1 to the driver 43, the IP stack L3 relay processing section 54 performs the L3 relay processing for the high-order relay frames A and B and then outputs the high-order relay frames A and B to the driver 43 in this order.

The pause frame PF1, the high-order relay frames A and the high-order relay frames B are transmitted in this order from the switch device 102 to the CGW 111B, the driving assist device 111D and the driving assist device 111D, respectively.

Figure 25:
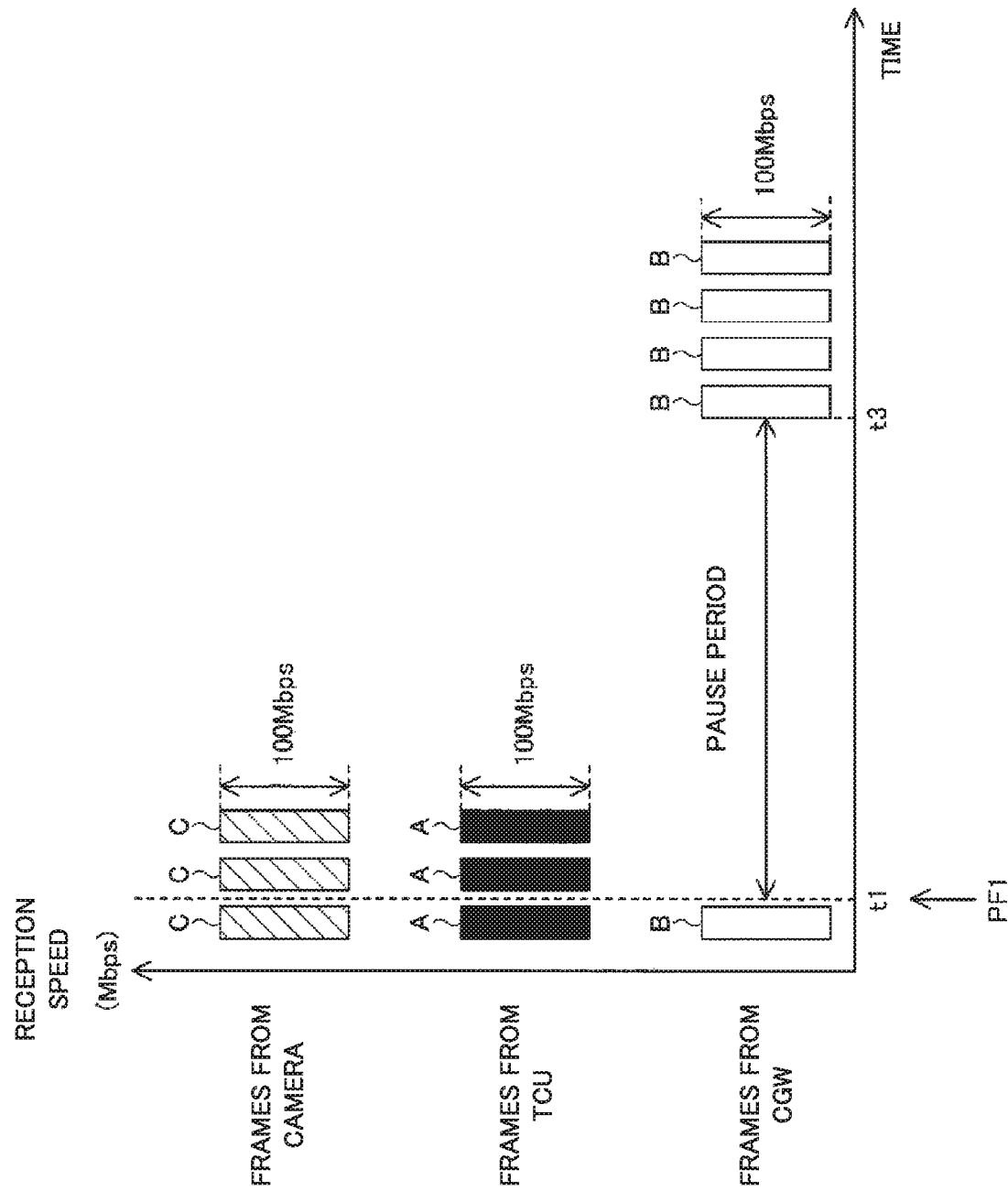
FIG. 25 is a view showing an example of a time chart indicating the time when the switch device in the on-vehicle communication system according to the second embodiment of the present disclosure receives the high-order relay frames and the low-order relay frames.

FIG. 25 is a view showing an example of a time chart indicating the time when the switch device in the on-vehicle communication system according to the second embodiment of the present disclosure receives the high-order relay frames and the low-order relay frames. In FIG. 25, the horizontal axis represents time and the vertical axis represents reception speed.

Referring to FIGS. 21 and 25, upon receiving the pause frame PF1 from the switch device 102, the CGW 111B stands by for the transmission of the high-order relay frames B to the switch device 102 during a pause period Pse having a length of 512 msec according to the content of the received pause frame PF1.

In this example, the CGW 111B stands by for the transmission of four high-order relay frames B to the switch device 102 for 512 msec after receiving the pause frame PF1.

On the other hand, since, unlike the CGW 111B, the TCU 111A does not receive the pause frame PF1 from the switch device 102, the TCU 111A transmits two more high-order relay frames A to the switch device 102 after time t1.

Referring to FIG. 24 again, upon receiving the two high-order relay frames A from the TCU 111A, the switch device 102 relays the received two high-order relay frames A and transmits the high-order relay frames A to the driving assist device 111D.

Furthermore, after time t3 when the pause period Pse expires, the switch device 102 receives four high-order relay frames B from the CGW 111B, relays the received four high-order relay frames B and transmits the high-order relay frames B to the driving assist device 111D.

With this configuration in which the transmission timing of the high-order relay frames B being lower in priority is delayed by using the pause frame PF1, the high-order relay frames A and B can be prevented from being congested in the switch device 102.

[Modified Pattern of Pause]

As shown in FIG. 24, since the switch device 102 cannot receive the high-order relay frames B from the CGW 111B until time t3 when the pause period Pse expires, the switch device 102 is put on standby for L3 relay processing even though the switch device 102 can afford to perform L3 relay processing in the period from time t2 when the transmission of the high-order relay frames A is completed to time t3.

Figure 26:
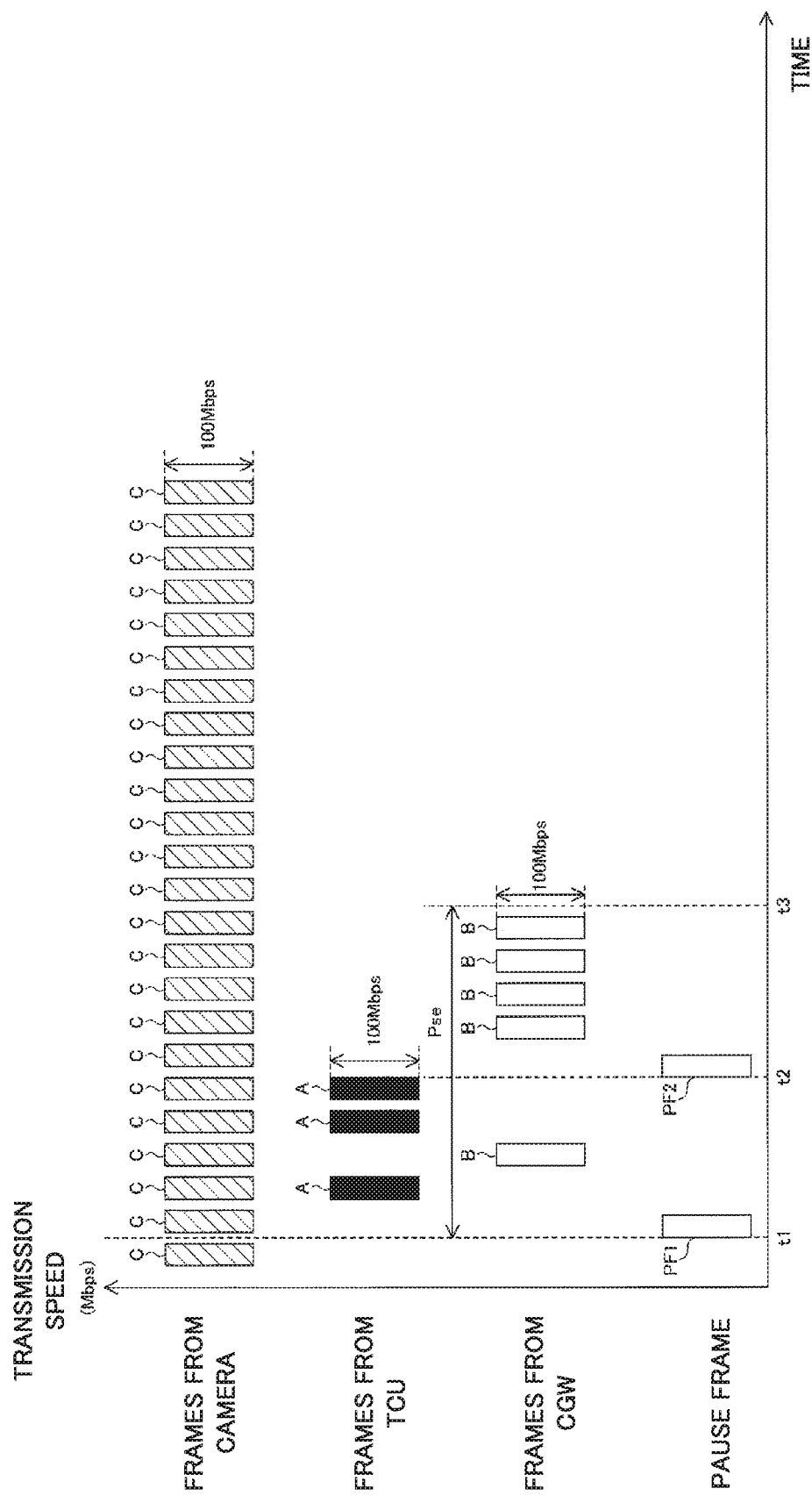
FIG. 26 is a view showing an example of a time chart indicating the time when the switch device according to the second embodiment of the present disclosure transmits the high-order relay frames and the low-order relay frames.

FIG. 26 is a view showing an example of a time chart indicating the time when the switch device according to the second embodiment of the present disclosure transmits the high-order relay frames and the low-order relay frames. In FIG. 26, the horizontal axis represents time and the vertical axis represents transmission speed.

Referring to FIGS. 21 and 26, when outputting the created pause frame PF1 to the switch section 31 via the driver 43 and the Ethernet controller 42 at time t1, the IP stack L3 relay processing section 54 changes its own state from a pause cancellation state to a pause state.

After that, since the IP stack L3 relay processing section 54 has outputted all the high-order relay frames to be subjected to L3 relay processing in the pause state to the driver 43 at time t2, the IP stack L3 relay processing section 54 creates a pause frame PF2 for cancelling the pause in the CGW 111B.

The pause frame PF2 includes the MAC address of the switch device 102, the MAC address of the CGW 111B and 0x0000 as MAC-SA, MAC-DA and the transmission stop period, respectively.

The IP stack L3 relay processing section 54 outputs the created pause frame PF2 to the switch section 31 via the driver 43 and the Ethernet controller 42 and changes its own state from the pause state to the pause cancellation state.

Upon receiving the pause frame PF2 from the processing section 51, the L2 switch processing section 32 in the switch section 31 transmits the received pause frame PF2 to the CGW 111B via the communication port 34B.

Figure 27:
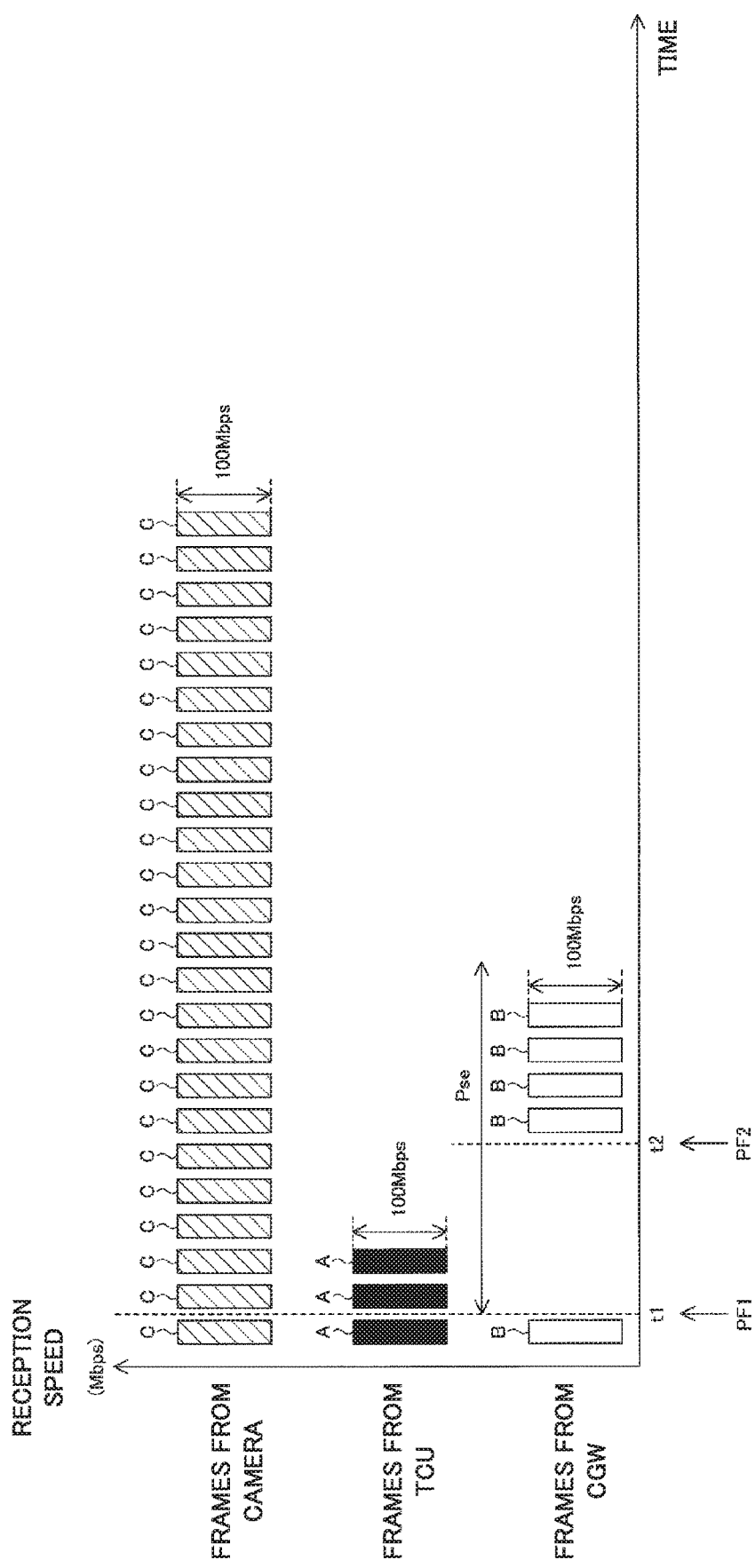
FIG. 27 is a view showing an example of a time chart indicating the time when the switch device in the on-vehicle communication system according to the second embodiment of the present disclosure receives the high-order relay frames and the low-order relay frames.

FIG. 27 is a view showing an example of a time chart indicating the time when the switch device in the on-vehicle communication system according to the second embodiment of the present disclosure receives the high-order relay frames and the low-order relay frames. In FIG. 27, the horizontal axis represents time and the vertical axis represents reception speed.

Referring to FIGS. 21 and 27, upon receiving the pause frame PF2 from the switch device 102, the CGW 111B recognizes that the length of the pause period Pse is shortened to 0 msec on the basis of the content of the received pause frame PF2 and starts the transmission of the four high-order relay frames B being put on standby to the switch device 102.

Referring to FIG. 26 again, the switch device 102 receives the four high-order relay frames B from the CGW 111B and then relays and transmits the received four high-order relay frames B to the driving assist device 111D.

With this configuration in which the length of the pause period Pse is adjusted by using the pause frame PF2, a situation is prevented in which the IP stack L3 relay processing section 54 is put on standby for L3 relay processing even though the IP stack L3 relay processing section 54 can afford to perform L3 relay processing.

[Flow of Operation]

The switch device 102 is equipped with a computer, and an arithmetic processing section, such as a CPU, in the computer reads a program including some or all of the respective steps of the flow chart described below and executes the program. The program for this device can be installed externally. The program for this device is distributed in a state of being stored on a recording medium.

Figure 28:
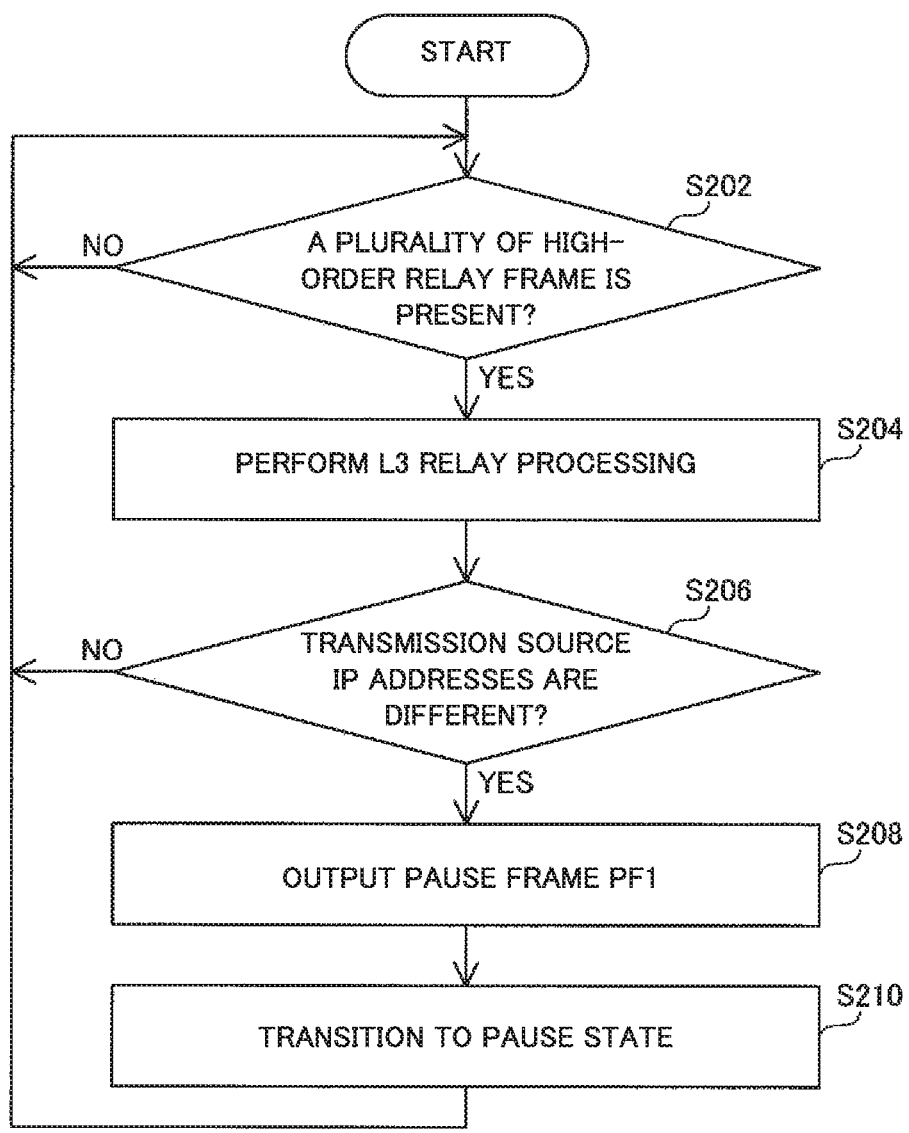
FIG. 28 is a flow chart specifying an operation procedure to be followed when the switch device according to the second embodiment of the present disclosure relays the high-order relay frames.

FIG. 28 is a flow chart specifying an operation procedure to be followed when the switch device according to the second embodiment of the present disclosure relays the high-order relay frames.

Referring to FIG. 28, a situation is assumed in which the processing section 51 in the switch device 102 is in the pause cancellation state.

First, the processing section 51 in the switch device 102 stands by until the processing section 51 confirms that a plurality of high-order relay frames is present by using the polling system or the event-driven system (NO at step S202).

And then, upon confirming that a plurality of high-order relay frames is present (YES at step S202), the processing section 51 performs L3 relay processing for the received plurality of high-order relay frames (at step S204).

Next, in the case that the transmission source IP addresses included in the plurality of high-order relay frames having been subjected to the L3 relay processing are different (YES at step S206), the processing section 51 creates the pause frame PF1 and outputs the created pause frame PF1 to the switch section 31 (at step S208).

Next, the processing section 51 changes its own state from the pause cancellation state to the pause state (at step S210).

Next, in the case that the transmission source IP addresses included in the plurality of high-order relay frames having been subjected to the L3 relay processing are the same (NO at step S206) or in the case that the processing section 51 changes its own state from the pause cancellation state to the pause state (at step S210), the processing section 51 stands by until the processing section 51 confirms that a plurality of high-order relay frames is present by using the polling system or the event-driven system (NO at step S202).

At the above-mentioned step S208, the processing section 51 may control the output order of the plurality of high-order relay frames having been subjected to the L3 relay processing to the switch section 31 according to the transmission source IP addresses by Strict Priority Queuing or Weighted Round Robin.

Furthermore, the order of the above-mentioned steps S208 and S210 is not limited to the above-mentioned order but may be exchanged.

Figure 29:
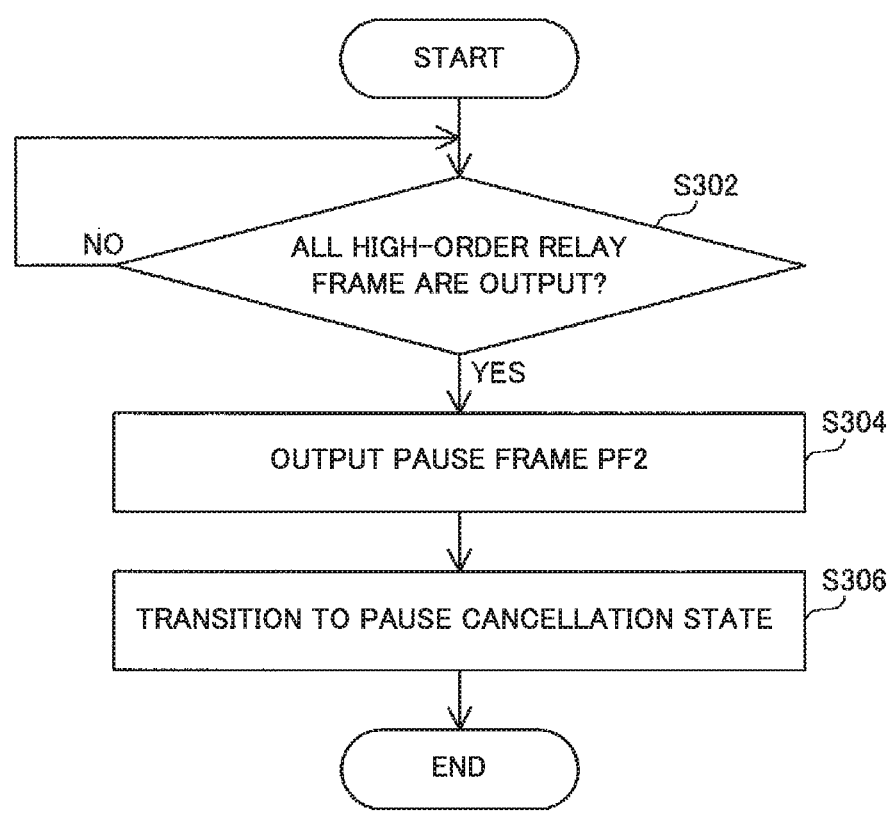
FIG. 29 is a flow chart specifying an operation procedure to be followed when the switch device according to the second embodiment of the present disclosure shortens a pause period.

FIG. 29 is a flow chart specifying an operation procedure to be followed when the switch device according to the second embodiment of the present disclosure shortens the pause period.

Referring to FIG. 29, a situation is assumed in which the processing section 51 in the switch device 102 is in the pause state.

First, the processing section 51 in the switch device 102 stands by until all the high-order relay frames having been subjected to the L3 relay processing are output to the switch section 31 (NO at step S302).

And then, after all the high-order relay frames having been subjected to the L3 relay processing are output to the switch section 31 (Yes at step S302), the processing section 51 creates the pause frame PF2 and outputs the created pause frame PF2 to the switch section 31 (at step S304).

Next, the processing section 51 changes its own state from the pause state to the pause cancellation state (at step S306).

Furthermore, the order of the above-mentioned steps S304 and S306 is not limited to the above-mentioned order but may be exchanged.

Moreover, in the switch device according to the second embodiment according to the present disclosure, although the processing section 51 is configured so as to determine the on-vehicle communication device 111 to which the pause frame PF1 should be transmitted on the basis of the priority, the configuration thereof is not limited to this configuration. The processing section 51 may also be configured so as to determine the on-vehicle communication device 111 to which the pause frame PF1 should be transmitted regardless of the priority.

What's more, in the switch device according to the second embodiment according to the present disclosure, in the case that a plurality of high-order relay frames is present, although the processing section 51 is configured so as to transmit the pause frame PF1 when the transmission source IP addresses of the respective high-order relay frames are different, the configuration thereof is not limited to this configuration. In the case that a plurality of high-order relay frames is present, the processing section 51 may also be configured so as to transmit the pause frame PF1 when the transmission source MAC addresses of the respective high-order relay frames are different.

Still further, in the switch device according to the second embodiment according to the present disclosure, although the processing section 51 is configured so as to transmit the pause frame PF1 having the length of the period during which the processing section 51 should stand by for the transmission of the high-order relay frames, the configuration thereof is not limited to this configuration. The processing section 51 may also be configured so as to transmit an Ethernet frame or an IP packet indicating the expiration timing of the period during which the processing section 51 should stand by for the transmission of the high-order relay frames.

As described above, the switch device according to the second embodiment of the present disclosure relays data in the on-vehicle network. The processing section 51 performs the relay processing via the switch section 31. Furthermore, in the case that a plurality of Ethernet frames to be subjected to the relay processing in the processing section 51 and when the transmission source IP addresses of the respective Ethernet frames are different, the processing section 51 transmits an instruction relating to frame transmission timing to at least either one of the devices having the respective transmission source IP addresses.

In the case that the transmission source IP addresses of the respective Ethernet frames are different as described above, in other words, in the case of a congested state, the degree of the congestion can be lowered or the congested state can be changed to a non-congested state by using a configuration in which, for example, a transmission delay request is transmitted to at least either one of the devices having the respective transmission source IP addresses, whereby data loss can be prevented without using a configuration in which the output rate of the data from the MCU to the L2 switch is lowered. Hence, in the on-vehicle network, the relay processing for the data can be performed efficiently while preventing data loss.

Since the other configurations and operations are similar to those in the on-vehicle communication system according to the first embodiment, the detailed descriptions thereof are not repeated.

Some or all of the components and operations of the respective devices according to the first embodiment and the second embodiment of the present disclosure can be combined appropriately.

It is assumed that the above-mentioned embodiments are merely examples in all respects and not to be understood as limiting. The scope of the present disclosure is not defined by the above description, but by the appended claims, and includes all the changes within the meanings and ranges equivalent to the claims.

The above-mentioned description includes the features appended in the following supplementary notes.

[Supplementary Note1]

A switch device for relaying data in an on-vehicle network, being equipped with:

a switch section and a processing section for performing the relay processing via the switch section, wherein in the case that a plurality of frames to be subjected to the relay processing is present in the processing section, the processing section performs adjustment processing so that the output rates of the respective frames to the switch section in the case that the transmission source addresses of the respective frames are different are made smaller than the output rates in the case that the transmission source addresses of the respective frames are the same, the switch device operating according to a communication protocol having a plurality of layers, wherein the switch section can perform the relay processing according to the first layer of the plurality of layers without using the processing section, and the processing section performs the relay processing according to the second layer higher than the first layer, and the switch device being further configured so that:

the switch section is equipped with a first storage section for storing the frames, the processing section can store the frames in a second storage section, the storage capacity of which is larger than that of the first storage section, the frames are Ethernet frames, and the transmission source addresses are transmission source IP addresses or transmission source MAC addresses.

[Supplementary Note2]

A switch device for relaying data in an on-vehicle network, being equipped with:

a switch section and a processing section for performing the relay processing via the switch section, wherein in the case that a plurality of frames to be subjected to the relay processing is present in the processing section and when the transmission source addresses of the respective frames are different, the processing section performs adjustment processing for transmitting an instruction regarding the transmission timing of the frames to at least either one of the devices having the respective transmission source addresses, the switch device operating according to a communication protocol having a plurality of layers, wherein the switch section can perform the relay processing according to the first layer of the plurality of layers without using the processing section, and the processing section performs the relay processing according to the second layer higher than the first layer, and the switch section being further configured so that:

the switch section is equipped with a first storage section for storing the frames, the processing section can store the frames in a second storage section, the storage capacity of which is larger than that of the first storage section, the frames are Ethernet frames, the transmission source addresses are transmission source IP addresses or transmission source MAC addresses, and the instruction is a pause frame.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A switch device for relaying data in an on-vehicle network, comprising:

a switch section for performing a first relaying processing as a layer 2 switch for a low-order relay frame that is a frame between on-vehicle devices belonging to a same subnet, and a processing section for performing a second relay processing as a layer 3 switch via the switch section for a high-order relay frame that is a frame between on-vehicle devices belonging to subnets different from each other, wherein the switch section transmits the low-order relay frame at a constant transmission speed, and in the case that a first high-order relay frame and a second high-order relay frame that are frames to be subjected to the second relay processing are present in the processing section, the processing section performs adjustment processing to set the transmission speeds of the first high-order relay frame and the second high-order relay frame to a first speed in the case that the transmission source addresses of the first high-order relay frame and the second high-order relay frame are same, and to set the transmission speeds of the first high-order relay frame and the second high-order relay frame to a second speed that is lower than the first speed in the case that the transmission source addresses of the first high-order relay frame and the second high-order relay frame are different.

2. The switch device according to claim 1, wherein the processing section sets the transmission speeds of the first high-order relay frame and the second high-order relay frame in the case that the transmission source addresses of the first high-order relay frame and the second high-order relay frame are different to the same value.

3. The switch device according to claim 2, wherein, in the case that the transmission source addresses of the first high-order relay frame and the second high-order relay frame are different, the processing section outputs the first high-order relay frame and the second high-order relay frame to the switch section according to the priority of the respective transmission source addresses.

4. The switch device according to claim 1, wherein the processing section sets output rates of the first high-order relay frame and the second high-order relay frame in the case that the transmission source addresses of the first high-order relay frame and the second high-order relay frame are different to different values at all or some of the respective transmission source addresses.

5. The switch device according to claim 1, wherein the processing section periodically confirms whether a plurality of high-order relay frames to be subjected to the second relay processing is present.

6. The switch device according to claim 1, wherein the processing section performs the adjustment processing in the case that a predetermined number or more of high-order relay frames to be subjected to the second relay processing have been stored.

7. A communication control method in a switch device for relaying data in an on-vehicle network and being equipped with a switch section for performing a first relaying processing as a layer 2 switch for a low-order relay frame that is a frame between on-vehicle devices belonging to a same subnet, and a processing section for performing a second relay processing as a layer 3 switch via the switch section for a high order relay frame that is a frame between on-vehicle devices belonging to subnets different from each other, comprising:

the step of transmitting the low-order relay frame at a constant transmission speed by the switch section, the step of performing the second relay processing via the switch section and the step of confirming, whether a plurality of frames to be subjected to the second relay processing is present in the processing section, wherein in the step of performing the second relay processing, in the case that a first high-order relay frame and a second high-order relay frame that are frames to be subjected to the second relay processing are present in the processing section, adjustment processing is performed to set the transmission speeds of the first high-order relay frame and the second high-order relay frame to a first speed in the case that the transmission source addresses of the first high-order relay frame and the second high-order relay frame are same, and to set the transmission speeds of the first high-order relay frame and the second high-order relay frame to a second speed that is lower than the first speed in the case that the transmission source addresses of the first high-order relay frame and the second high-order relay frame are different.

8. A computer readable non-transitory recording medium recording a communication control program for use in a switch device for relaying data in an on-vehicle network and for making a computer function as:

a switch section for performing a first relaying processing as a layer 2 switch for a low-order relay frame that is a frame between on-vehicle devices belonging to a same subnet, and a processing section for performing a second relay processing as a layer 3 switch via the switch section for a high-order relay frame that is a frame between on-vehicle devices belonging to subnets different from each other, wherein, the switch section transmits the low-order relay frame at a constant transmission speed, and in the case that a first high-order relay frame and a second high-order relay frame that are frames to be subjected to the second relay processing are present in the processing section, the processing section performs adjustment processing to set the transmission speeds of the first high-order relay frame and the second high-order relay frame to a first speed in the case that the transmission source addresses of the first high-order relay frame and the second high-order relay frame are same, and to set the transmission speeds of the first high-order relay frame and the second high-order relay frame to a second speed that is lower than the first speed in the case that the transmission source addresses of the first high-order relay frame and the second high-order relay frame are different.

* * * * *